(12) United States Patent  
Hazama et al.

(10) Patent No.: US 8,042,950 B2
(45) Date of Patent: Oct. 25, 2011

(54) PROJECTION APPARATUS AND IMAGE DISPLAY APPARATUS WITH INDIVIDUAL COLOR LIGHT DIFFUSION AND MICROLENS ARRAY

(75) Inventors: Yoshikazu Hazama, Kanagawa (JP); Kikuo Kaise, Kanagawa (JP)

(73) Assignee: Sony Corporation, Tokyo (JP)

( * ) Notice: Subject to any disclaimer, the term of this patent is extended or adjusted under 35 U.S.C. 154(b) by 395 days.

(21) Appl. No.: 12/309,924

(22) PCT Filed: Aug. 16, 2007

(86) PCT No.: PCT/JP2007/065949  
§ 371 (c)(1),  
(2), (4) Date: Feb. 3, 2009

(87) PCT Pub. No.: WO2008/026452  
PCT Pub. Date: Mar. 6, 2008

(65) Prior Publication Data  
US 2009/0323030 A1 Dec. 31, 2009

(30) Foreign Application Priority Data  
Aug. 31, 2006 (JP) .................................. 2006-236218

(51) Int. Cl.  
G03B 21/26 (2006.01)  
G03B 21/14 (2006.01)  
G09G 3/00 (2006.01)  
G02B 5/02 (2006.01)  
G02B 13/20 (2006.01)  
G02F 1/1335 (2006.01)

(52) U.S. Cl. ................. 353/30; 353/38; 353/20; 345/32; 359/599; 359/707; 349/64; 349/95

(58) Field of Classification Search .................... 353/30, 353/38, 20; 345/32; 359/599, 707; 349/64, 349/95  
See application file for complete search history.

(56) References Cited

U.S. PATENT DOCUMENTS

| 6,836,365 B2 * | 12/2004 | Goto ............................ 359/569 |
| 7,746,559 B2 * | 6/2010 | Sharon et al. .................. 359/618 |
| 2003/0151785 A1 * | 8/2003 | Vertoprakhov ................ 359/15 |

FOREIGN PATENT DOCUMENTS

| JP | 2000-105362 A | 4/2000 |
| JP | 2002-156617 A | 5/2002 |
| JP | 2002-202414 A | 7/2002 |

(Continued)

OTHER PUBLICATIONS

International Search Report; International Application No. PCT/JP2007/065949; Date: Sep. 11, 2007.

(Continued)

Primary Examiner — Georgia Epps  
Assistant Examiner — Magda Cruz  
(74) Attorney, Agent, or Firm — Rader, Fishman & Grauer PLLC

(57) ABSTRACT

A projection apparatus and image display apparatus. The apparatus includes a three-color light source that emits a plurality of color lights having different wavelengths, and a diffraction type optical element that performs diffusion forming of individual color lights. A field lens makes the diffusion-formed individual color lights into parallel lights, and a liquid crystal panel has a microlens array with a plurality of microlenses arranged in a matrix at the incident regions of the individual parallel color lights. A pixel section has three pixel openings arranged oppositely to the individual microlenses.

14 Claims, 21 Drawing Sheets

FOREIGN PATENT DOCUMENTS

| | | |
|---|---|---|
| JP | 2004-029784 A | 1/2004 |
| JP | 2004-264776 A | 9/2004 |
| JP | 2005-173562 A | 6/2005 |
| JP | 2005-202068 A | 7/2005 |
| JP | 2005-202069 A | 7/2005 |

OTHER PUBLICATIONS

English Language Translation of Japanese Office Action issued May 10, 2011 for Japanese Application No. 2006-236218.

* cited by examiner

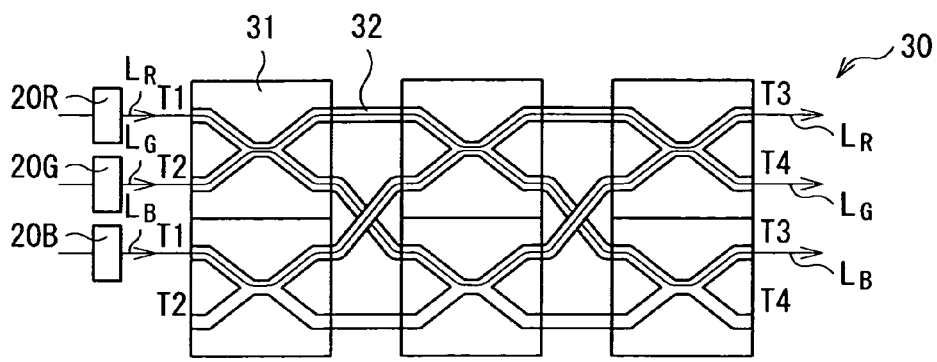
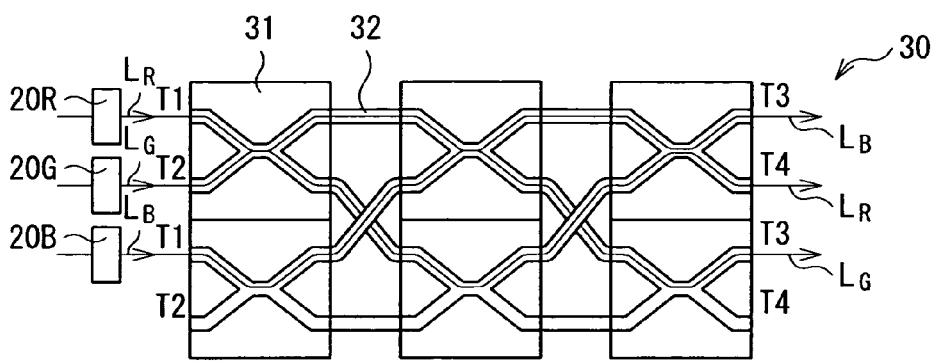
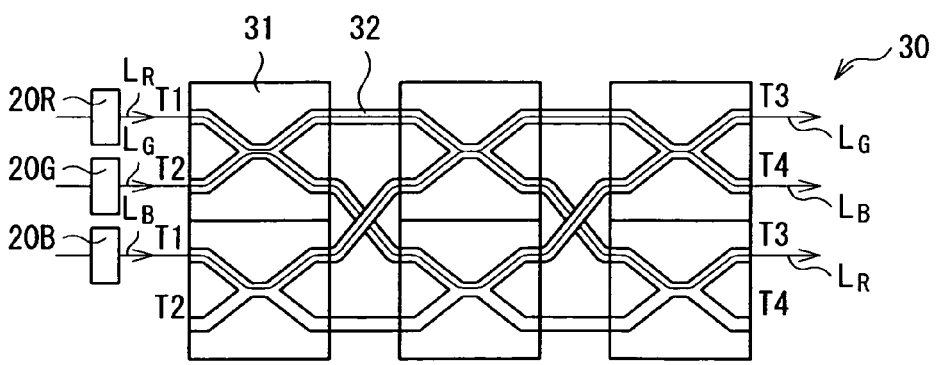

PROJECTION APPARATUS AND IMAGE DISPLAY APPARATUS WITH INDIVIDUAL COLOR LIGHT DIFFUSION AND MICROLENS ARRAY

TECHNICAL FIELD

The present invention relates to a projection apparatus such as a liquid crystal projector, and an image display apparatus such as a back projection type display to display an image by enlarging and projecting the image light projected from the projection apparatus onto the back of a screen.

BACKGROUND ART

In recent years, in liquid crystal projectors to enlarge and project the image on a liquid crystal panel by a projection optical system, low price, long lifetime and high contrast have been advanced, and there has been an increase in cases of using the liquid crystal projector at home. Recently, even in the liquid crystal projectors, it is strongly desired to realize high-fine images on a large screen, and the number of pixels of a liquid crystal panel increases year-over-year.

Although the number of pixels of the liquid crystal panel has been thus increasing on a year-over-year basis, correspondingly increasing the size of the liquid crystal panel is contrary to the demand for miniaturization of a display apparatus, and hence the pixel size is reduced to deal with the high-pixel.

However, the pixel size reduction increases the ratio per pixel occupied by various types of wirings formed within individual pixels such as data lines, scan lines and capacity lines, and various types of electronic devices such as thin film transistors and thin film diodes. Therefore, the area (the aperture part) enabling transmission or reflection of the lights contributing to an image display may be narrowed by these various types of wirings and these various types of electronic devices.

In general, the ratio of the aperture part per pixel (the aperture ratio) is approximately 50% to 70%, and the light transmitting through the liquid crystal panel is decreased as the aperture ratio is lowered. Hence, various techniques for increasing the number of pixels by improving the display mode instead of a considerable reduction of the pixel size have been conventionally proposed.

For example, patent document 1 proposes the display mode that divides white light into three colors of red, green and blue, and irradiates different color lights to adjacent three dots, respectively, and also periodically switches the light paths of these color lights. It is described that because this enables 1-pixel full color display with individual dots, the number of pixels can be increased about three times that of the existing display mode in which the full color display has been performed with three adjacent dots.

Patent document 1: Japanese Unexamined Patent Application Publication No. 2000-105362

DISCLOSURE OF INVENTION

However, the patent document 1 employs mechanically rotating optical components, such as a galvano-mirror and a step mirror, in order to periodically switch the optical paths of the three color lights. Consequently, there is the problem that noise occurs during the rotation, and the rotating optical components are susceptible to malfunction, and the reliability is extremely low and hence undurable in practical use.

The present invention is made in view of the above problem, and its object is to provide a projection apparatus and an image display apparatus with high reliability, without causing noise during switching of the optical paths of individual color lights.

A first projection apparatus of the present invention includes a light source section individually and independently emitting a plurality of color lights having different wavelengths, and an optical path switching section electrically switching optical paths of individual color lights emitted from the light source section, at predetermined time intervals. The projection apparatus further includes: a diffusion forming section performing diffusion forming of individual color lights outputted from the optical path switching section; a parallel light making section making individual color lights diffusion-formed by the diffusion forming section into parallel lights; a color image light generating section having a microlens array where a plurality of microlenses are arranged in a matrix at incident regions of individual color lights made into parallel lights by the parallel light making section, and having a pixel section where dots whose number is equal to the number of colors of color lights emitted from the light source section are arranged oppositely to the individual microlenses, and generating color image lights by using individual color lights transmitted through the individual dots; and a projection section enlarging and projecting color image lights generated by the color image light generating section. A first image display apparatus of the present invention is the apparatus in which the above-mentioned first projection apparatus is housed, and displays images by enlarging and projecting the image lights projected from the first projection apparatus onto the back of a screen.

In the first projection apparatus and the first image display apparatus of the present invention, the optical paths of the individual color lights emitted individually and independently from the light source section are electrically switched at predetermined time intervals by the optical path switching section.

A second projection apparatus of the present invention includes a light source section individually and independently emitting a plurality of color lights having different wavelengths, and electrically switching the wavelengths of the individually and independently emitted individual color lights, at predetermined time intervals. The projection apparatus further includes: a diffusion forming section performing diffusion forming of individual color lights emitted from the light source section; a parallel light making section making individual color lights diffusion-formed by the diffusion forming section into parallel lights; a color image light generating section having a microlens array where a plurality of microlenses are arranged in a matrix at incident regions of individual color lights made into parallel lights by the parallel light making section, and having a pixel section where dots whose number is equal to the number of colors of color lights emitted from the light source section are arranged oppositely to the individual microlenses, and generating color image lights by using individual color lights transmitted through the individual dots; and a projection section enlarging and projecting color image lights generated by the color image light generating section. A second image display apparatus of the present invention is the apparatus in which the second projection apparatus is housed, and displays images by enlarging and projecting the image lights projected from the second projection apparatus onto the back of a screen.

In the second projection apparatus and the second image display apparatus of the present invention, the wavelengths of the individual color lights are individually and independently emitted and also electrically switched at predetermined time intervals by the light source section.

According to the first projection apparatus and the first image display apparatus of the present invention, the optical paths of the individual color lights emitted individually and independently from the light source section are electrically switched at predetermined time intervals by the optical path switching section. Therefore, no noise occurs during switching of the optical paths of the individual color lights, and the reliability is improved.

According to the second projection apparatus and the second image display apparatus of the present invention, the wavelengths of the individual color lights emitted individually and independently are electrically switched at predetermined time intervals by the light source section. Therefore, no noise occurs during switching of the optical paths of the individual color lights, and the reliability is improved.

BRIEF DESCRIPTION OF DRAWINGS

FIG. 6 is a conceptual diagram for explaining the action of the waveguide type optical switch of FIG. 5.

BEST MODE(S) FOR CARRYING OUT THE INVENTION

Embodiments of the present invention will be described below in detail with reference to the drawings.

First Embodiment

Figure 1:
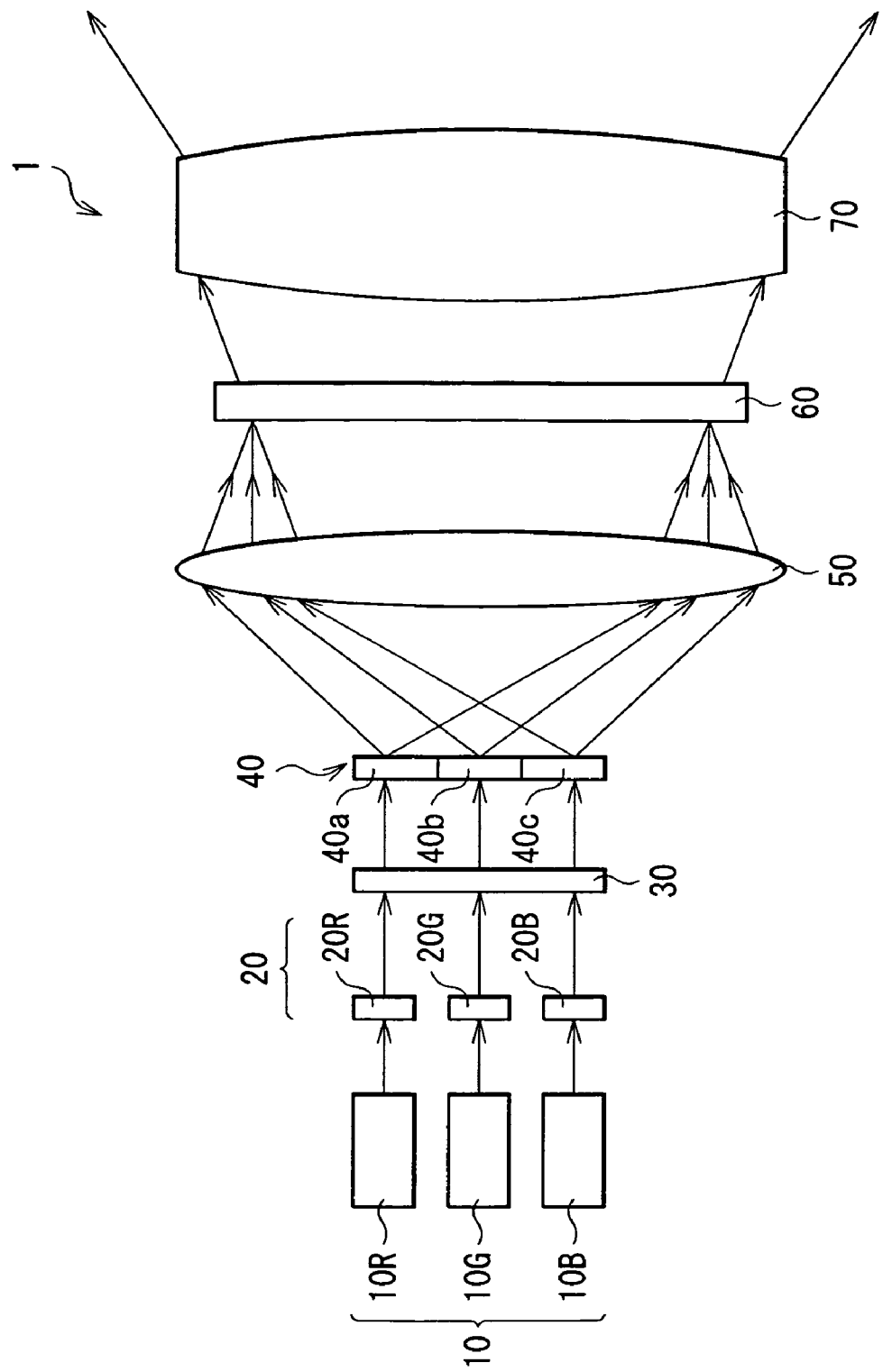
FIG. 1 is a schematic configuration diagram of a liquid crystal projector according to a first embodiment of the invention.

FIG. 1 shows the schematic configuration of a liquid crystal projector 1 (a projection apparatus) according to a first embodiment of the invention. The liquid crystal projector 1 is a single plate type projector using a color-filterless liquid crystal panel 60 (a color image light generating section) as a light valve, and a three-color light source 10 (a light source section) individually and independently emitting three color lights of RGB is used as the backlight of the liquid crystal panel 60.

The liquid crystal projector 1 is configured by arranging the three-color light source 10, a polarizing plate 20, a waveguide type optical switch 30 (an optical path switching section), a diffraction type optical element 40 (a diffusion forming section), a field lens 50 (a parallel light making section), the liquid crystal panel 60 and a projection lens 70 (a projection section) in this order along the optical axes of the lights projected from the three-color light source 10.

The three-color light source 10 is composed of a red laser 10R, a green laser 10G and a blue laser 10B, and configured, for example, by parallel-arranging these lasers so that their respective optical axes are parallel to one another.

The red laser 10R is composed of, for example, an InAlGaP-based semiconductor laser, and the blue laser 10B is composed of, for example, a GaN-based or an InGaN-based semiconductor laser. On the other hand, the green laser 10G is composed of, for example, a solid-state laser excited by a semiconductor laser. Examples of the solid-state laser include solid-state lasers composed of YVO4+KTP (KTiOPO4), crystal PPLN (Periodically Poled LiNbO3), or PPMgO.LN (Periodically Poled MgO.LiNbO3). Alternatively, the green laser 10G may be, if possible, constructed by a semiconductor laser as in the case of the red laser 10R or the blue color laser 10B. Further, the oscillation mode of the three-color light source 10 may be either one of single mode and multi mode because the diffraction type optical element 40 is insensible to the beam shapes of incident lights, as will be described later.

The polarizing plate 20 is constructed of polarizing plates 20R, 20G and 20B, and configured by individually arranging these plates on the optical paths of the individual color lights (the beam lights) emitted from the three-color light source 10. The polarizing plates 20R, 20G and 20B are constructed of, for example, half-wave plates corresponding to the wavelengths of the individual color lights, respectively, and configured so that the polarizing directions of the individual color lights are matched with the polarizing axis of the liquid crystal panel 60. When the three-color light source 10 is constructed of the solid-state laser, the polarizing plates 20R, 20G and 20B may be constructed of phase difference films or phase difference plates, and the polarizing directions may be adjusted.

In the solid-state lasers using, for example, Al; GaAs-based semiconductor laser excited YVO4+KTP second harmonic wave, the polarizing directions are liable to change on a per-device basis, and they often have a polarization ratio of approximately 10. In the case where such a solid-state laser is used as the green laser 10G, the polarization ratio can be increased by forming the polarizing plate 20G from a phase difference film, and using the polarizing plate 20G to compensate for and optimize a retardation value. Thus, by adjusting the polarizing axis by the half-wave plate and the phase difference film, the light loss due to the polarizing plate (not shown) of the liquid crystal panel 60 can be reduced to further improve light utilization efficiency.

Figure 2A:
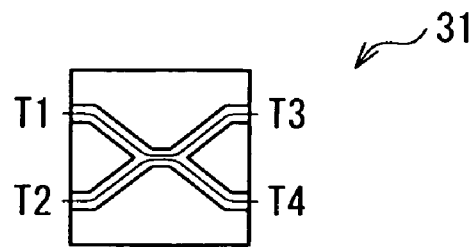
FIG. 2 is a schematic configuration diagram of a crossing element.

The waveguide type optical switch 30 is configured by optically connecting a plurality of crossing elements 31 with at least one of an optical fiber 32 and a mirror. In the following, explanation is made using, as an example, the case of connecting the individual crossing elements 31 with the optical fiber 32. In the crossing elements 31, as shown in FIGS. 2(A) and (B), two waveguides composed of, for example, LiNbO3 crystal (LN crystal) containing Ti are formed so as to intersect each other, and at least the end portions of individual waveguides are exposed to the surfaces of the crossing elements 31. Further, a pair of electrodes (not shown) are provided adjacent to a part of the two waveguides, and a voltage is applied to the pair of electrodes, and the resulting electric field is used to change the connection relationship between one end portions of individual waveguides (input terminals T1 and T2) and the other end portions (output terminals T3 and T4). That is, the crossing elements 31 function as optical switches to electrically switch the optical paths, so that the waveguide type optical switch 30 can arbitrarily switch the colors of color lights outputted to diffraction type optical elements 40a, 40b and 40c (described later) in predetermined time intervals.

Hereat, the waveguide type optical switch 30 may be configured to switch, per field or per frame or per multiframe, the optical paths of the individual color lights emitted from the three-color light source 10. Alternatively, the optical paths of the individual color lights emitted from the three-color light source 10 may be switched at a frequency that is an integral multiple of the frequency of one field or one frame.

Figure 2B:
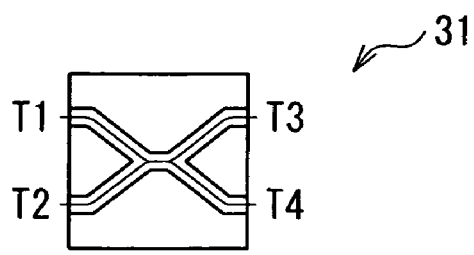

For example, in the off-state where no voltage is applied to the pair of electrodes, as shown in FIG. 2(A), it is configured so that the input terminal T1 and the output terminal T3 are connected to each other, and the input terminal T2 and the output terminal T4 are connected to each other. In the on-state where a voltage is applied to the pair of electrodes, as shown in FIG. 2(B), it is configured so that the input terminal T1 and the output terminal T4 are connected to each other, and the input terminal T2 and the output terminal T3 are connected to each other.

By arranging in an array the plurality of crossing elements 31 having the above optical switch function, optical switches having different connection forms can be realized. For example, when nine crossing elements 31 are arranged in an array of 3×3, an example of the connection form of the individual crossing elements 31 and the optical fiber 32 will be described with reference to FIG. 3. In the following, the individual crossing elements 31 constituting the waveguide type optical switch 30 are expressed as the elements of a 3×3 matrix.

The respective input terminals T1 of the three crossing elements 31 (element (1, 1), element (2, 1) and element (3, 1)) of the three-color light source 10 side (the left side of FIG. 3) are arranged oppositely to the regions of the emitting side surfaces of the polarizing plates 20R, 20G and 20B. Through the optical fiber 32, the output terminal T3 of the element (1, 1) is connected to the input terminal T1 of the element (1, 2), the output terminal T4 of the element (1, 1) is connected to the input terminal T1 of the element (2, 2), the output terminal T3 of the element (2, 1) is connected to the input terminal T2 of the element (1, 2), the output terminal T4 of the element (2, 1) is connected to the input terminal T1 of the element (3, 2), the output terminal T3 of the element (3, 1) is connected to the input terminal T2 of the element (2, 2), and the output terminal T4 of the element (3, 1) is connected to the input terminal T2 of the element (3, 2), respectively. Further, through the optical fiber 32, the output terminal T3 of the element (1, 2) is connected to the input terminal T1 of the element (1, 3), the output terminal T4 of the element (1, 2) is connected to the input terminal T1 of the element (2, 3), the output terminal T3 of the element (2, 2) is connected to the input terminal T2 of the element (1, 3), the output terminal T4 of the element (2, 2) is connected to the input terminal T1 of the element (3, 3), the output terminal T3 of the element (3, 2) is connected to the input terminal T2 of the element (2, 3), and the output terminal T4 of the element (3, 2) is connected to the input terminal T2 of the element (3, 3), respectively. Further, the respective output terminals T3 of the three crossing elements 31 (element (1, 3), element (2, 3) and element (3, 3)) of the diffraction type optical element 40 side (the right side of FIG. 3) are arranged oppositely to the incident side surface of the diffraction type optical element 40.

When the waveguide type optical switch 30 is thus configured, the positional relationship among the respective optical paths of red light $L_R$, green light $L_G$ and blue light $L_B$, and thus the colors of color lights outputted to the individual diffraction type optical elements 40a, 40b and 40c can be arbitrarily switched by suitably combining the on-state and the off-state of the individual crossing elements 31.

Figure 4A:
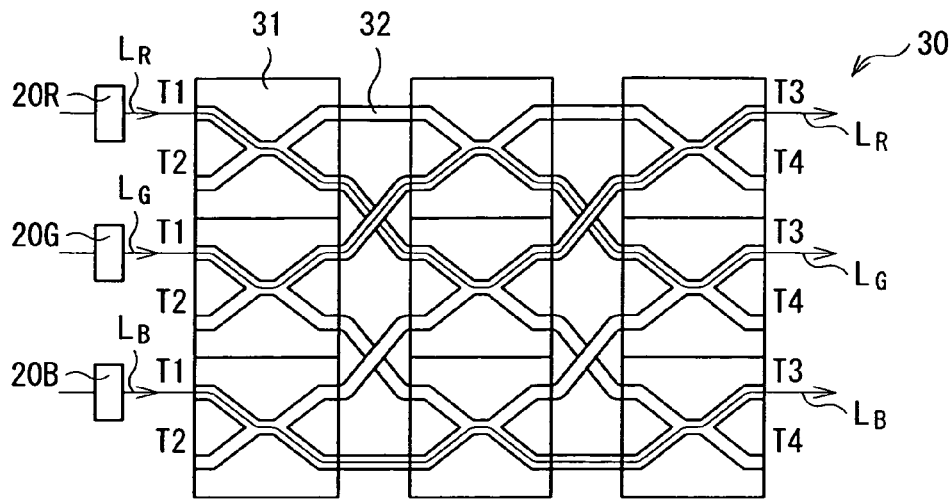
FIG. 4 is a conceptual diagram for explaining the action of the waveguide type optical switch of FIG. 3.

For example, as shown in FIG. 4(A), when only the element (2, 1), the element (1, 2), the element (2, 2), the element (3, 2) and the element (2, 3) are brought into the on-state, the red light $L_R$ inputted to the input terminal T1 of the element (1, 1) is outputted from the output element T3 of the element (1, 3), the green light $L_G$ inputted to the input terminal T1 of the element (1, 2) is outputted from the output element T3 of the element (2, 3), and the blue light $L_B$ inputted to the input terminal T1 of the element (1, 3) is outputted from the output element T3 of the element (3, 3). That is, in this case, the color lights arrayed and inputted from above the paper surface of FIG. 4(A) in the following order of the red light $L_R$, the green light $L_G$ and the blue light $L_B$ are outputted without changing the array, so that the red light $L_R$ is outputted to the diffraction type optical element 40a, the green light $L_G$ is outputted to the diffraction type optical element 40b, and the blue light $L_B$ is outputted to the diffraction type optical element 40c.

Figure 4B:
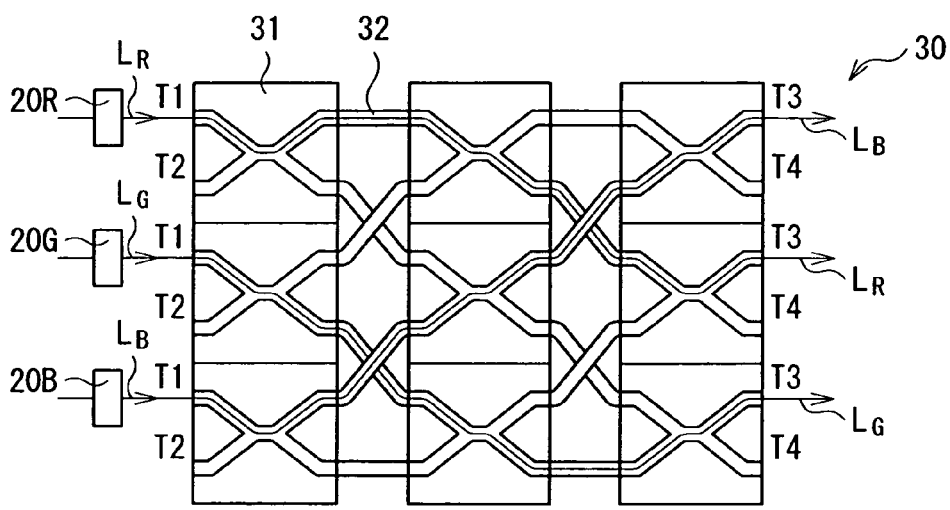

For example, as shown in FIG. 4(B), when only the element (1, 1), the element (3, 1) and the element (2, 3) are brought into the on-state, the red light $L_R$ inputted to the input terminal T1 of the element (1, 1) is outputted from the output element T3 of the element (2, 3), the green light $L_G$ inputted to the input terminal T1 of the element (1, 2) is outputted from the output element T3 of the element (3, 3), and the blue light $L_B$ inputted to the input terminal T1 of the element (1, 3) is outputted from the output element T3 of the element (1, 3). That is, in this case, the color lights arrayed and inputted from above the paper surface of FIG. 4(B) in the following order of the red light $L_R$, the green light $L_G$ and the blue light $L_B$ are outputted by switching the array from above the paper surface of FIG. 4(B) in the following order of the blue light $L_B$, the red light $L_R$ and the green light $L_G$, so that the blue light $L_B$ is outputted to the diffraction type optical element 40a, the red light $L_R$ is outputted to the diffraction type optical element 40b, and the green light $L_G$ is outputted to the diffraction type optical element 40c.

Figure 4C:
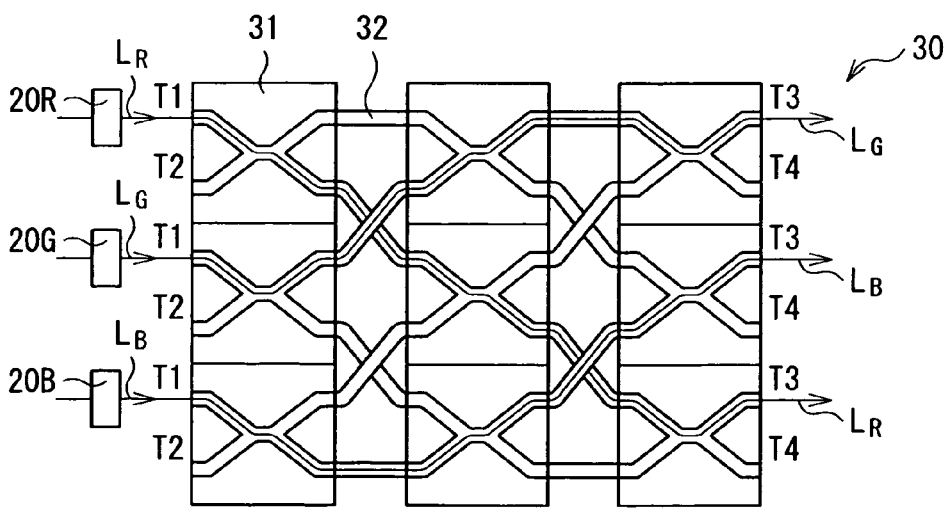

For example, as shown in FIG. 4(C), when only the element (2, 1), the element (1, 3) and the element (3, 3) are brought into the on-state, the red light $L_R$ inputted to the input terminal T1 of the element (1, 1) is outputted from the output element T3 of the element (3, 3), the green light $L_G$ inputted to the input terminal T1 of the element (1, 2) is outputted from the output element T3 of the element (1, 3), and the blue light $L_B$ inputted to the input terminal T1 of the element (1, 3) is outputted from the output element T3 of the element (2, 3). That is, in this case, the color lights arrayed and inputted from above the paper surface of FIG. 4(C) in the following order of the red light $L_R$, the green light $L_G$ and the blue light $L_B$ are outputted by switching the array from above the paper surface of FIG. 4(C) in the following order of the green light $L_G$, the blue light $L_B$ and the red light $L_R$, so that the green light $L_G$ is outputted to the diffraction type optical element 40a, the blue light $L_B$ is outputted to the diffraction type optical element 40b, and the red light $L_R$ is outputted to the diffraction type optical element 40c.

Figure 3:
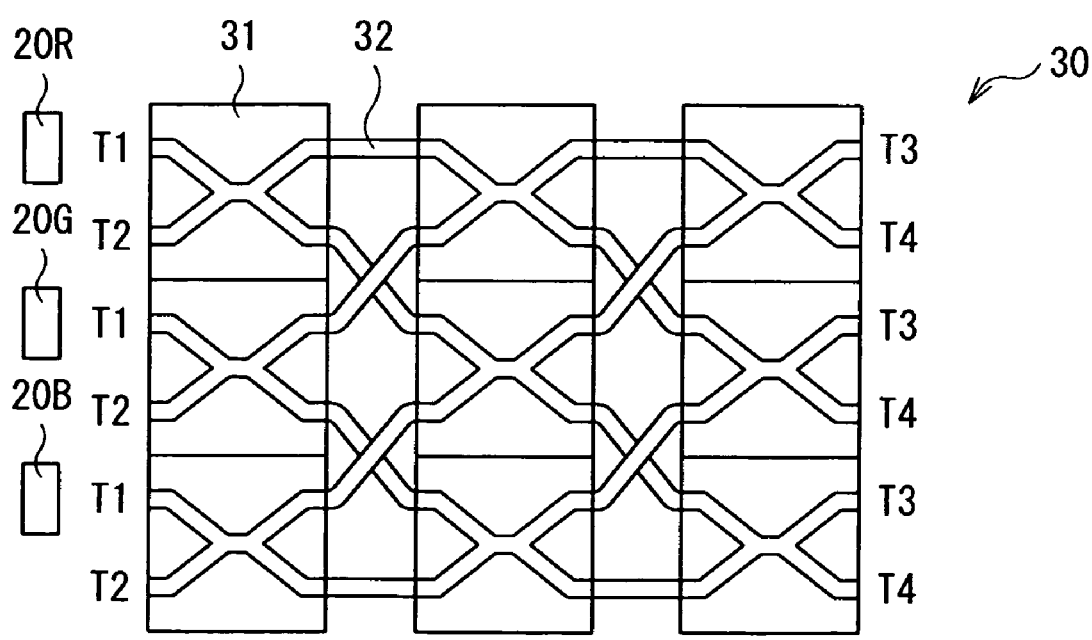
FIG. 3 is a schematic configuration diagram showing an example of a waveguide type optical switch.
Figure 5:
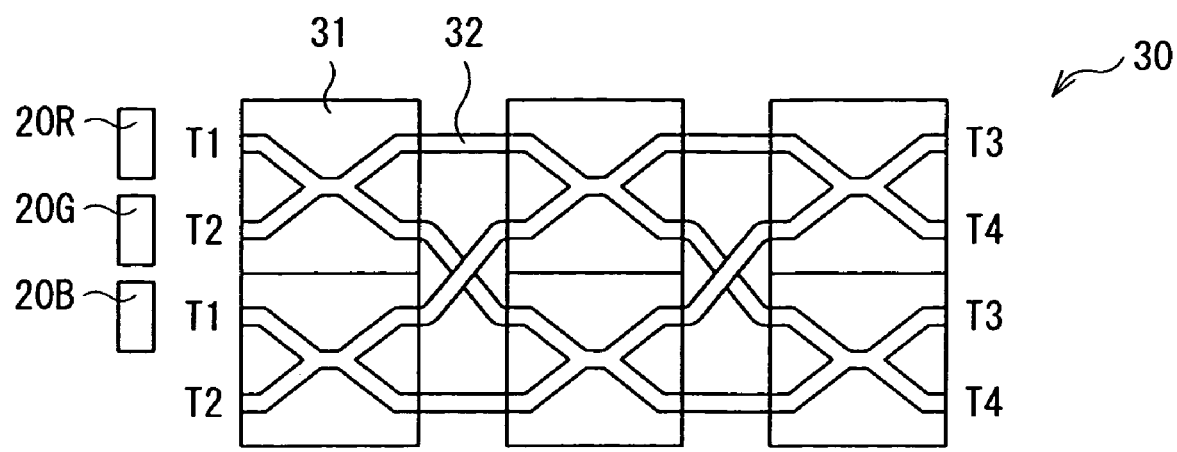
FIG. 5 is a schematic configuration diagram showing another example of the waveguide type optical switch.
Figure 7:
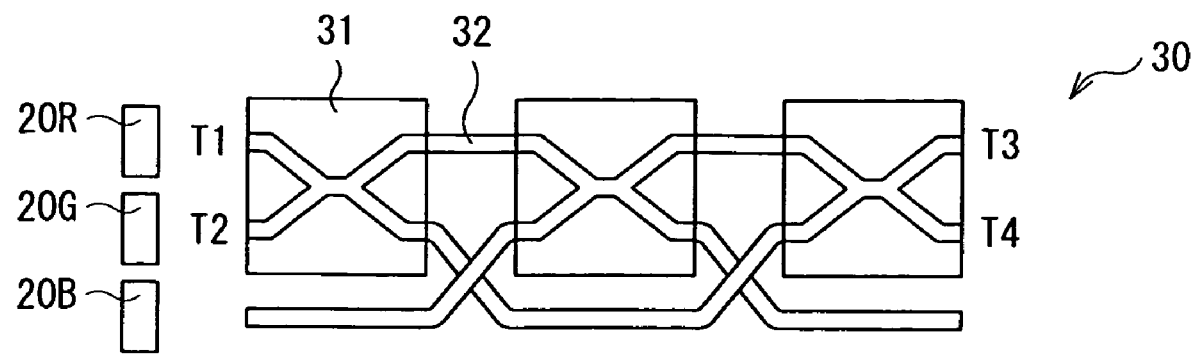
FIG. 7 is a schematic configuration diagram showing a still another example of the waveguide type optical switch.
Figure 8A:
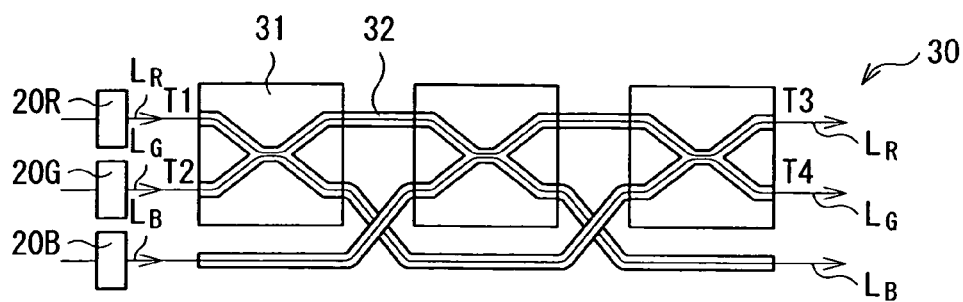
FIG. 8 is a conceptual diagram for explaining the action of the waveguide type optical switch of FIG. 7.
Figure 8B:
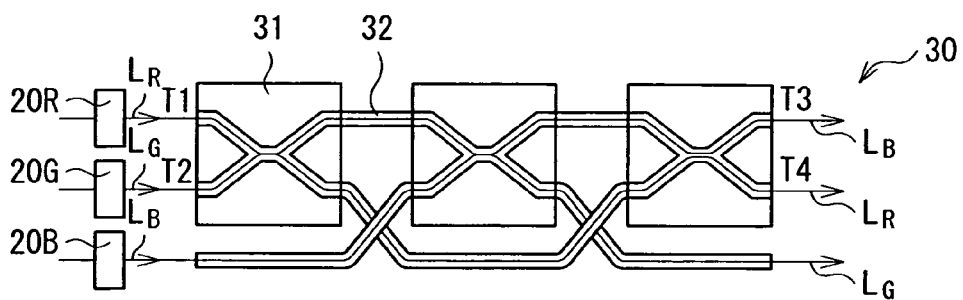
Figure 8C:
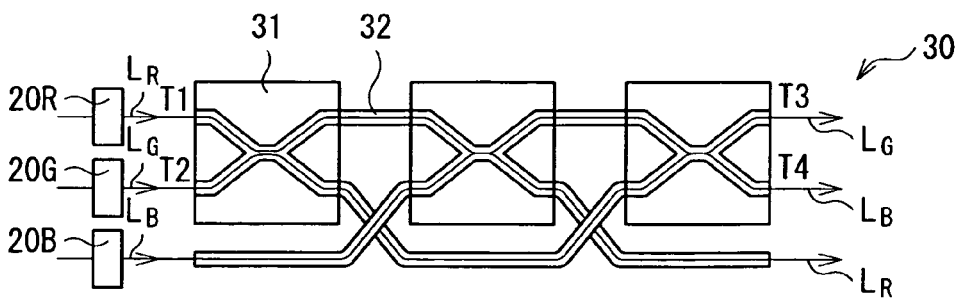

Meanwhile, as the connection forms capable of arbitrarily switching the colors of the color lights outputted to the individual diffraction type optical elements 40a, 40b and 40c in a similar manner as above, the connection form shown in FIG. 5 or FIG. 7 can be considered, for example. In the case of FIG. 5, six crossing elements 31 are arranged in an array of 2×3, thereby being capable of arbitrarily switching the colors of the color lights outputted to the individual diffraction type optical elements 40a, 40b and 40c, as shown in FIGS. 6(A) to (C). In the case of FIG. 7, three crossing elements 31 are arranged in an array of 1×3, thereby being capable of arbitrarily switching the colors of the color lights outputted to the individual diffraction type optical elements 40a, 40b and 40c, as shown in FIGS. 8(A) to (C). Consequently, when the waveguide type optical switch 30 has the configuration as shown in FIG. 5 or FIG. 7, the number of the crossing elements 31 can be reduced than when the waveguide type optical switch 30 has the configuration as shown in FIG. 3.

In the case of FIG. 7, because the input terminal T2 and the output terminal T4 of the element (2, 2) are not connected to other crossing element 31, one end of the optical fiber 32 connected to the input terminal T2 of the element (2, 2) is arranged oppositely to the polarizing plate 20B, and one end of the optical fiber 32 connected to the output terminal T4 of the element (2, 2) is arranged oppositely to the diffraction type optical element 40.

The diffraction type optical element 40 is constructed of the diffraction type optical elements 40a, 40b and 40c, and configured by individually arranging the optical elements 40a, 40b and 40c on the optical paths of the color lights (the beam lights) outputted from the waveguide type optical switch 30. The diffraction type optical elements 40a, 40b and 40c are configured to perform diffusion forming of the individual color lights outputted from the waveguide type optical switch 30 so as to expand throughout the entire display region (not shown) of the liquid crystal panel 60. Specifically, the diffraction type optical elements 40a, 40b and 40c convert the individual color lights (the beam lights) entered substantially vertically to the surface adjacent to the waveguide type optical switch 30, into diffused lights having different optical axis directions, and admit the diffused lights into the field lens 50 at different incident angles.

The diffraction type optical elements 40a, 40b and 40c are constructed of, for example, a DOE (Diffractive Optical Element). The DOE is for diffracting, for example, the incident light at a large number of points on an output plane, and configured to form the cross-sectional shape of the emitted light into predetermined shape and dimension by overlapping the individual diffractive lights with each other on the output plane, and also irradiate the output plane so as to make a luminance distribution uniform. The DOE has the property being insensible to the beam shapes of the incident lights.

The cross-sectional light intensity distributions of the individual color lights emitted from the three-color light source 10 have generally Gaussian shape and, as they are, it is difficult to uniformly irradiate onto the liquid crystal panel 60. However, a uniform luminance distribution over the liquid crystal panel 60 can be obtained by thus subjecting the individual color lights to diffusion forming through the diffraction type optical elements 40a, 40b and 40c and then irradiating onto the liquid crystal panel 60.

The field lens 50 is for changing the individual color lights diffusion-formed through the diffraction type optical elements 40a, 40b and 40c into parallel lights, and is commonly provided on the optical paths of the individual color lights. As described above, it is configured so that the individual color lights having different incident angles (the diffused lights) enter the field lens 50, and therefore the individual color lights refractively transmitted through the field lens 50 (the parallel lights) enter the liquid crystal panel 60 at different incident angles.

Here, the incident angles of the individual color lights entering the liquid crystal panel 60 depend on the incident angles of the individual color lights entering the field lens 50, and further the incident angles of the individual color lights entering the field lens 50 are changed depending upon which one of the diffraction type optical elements 40a, 40b and 40c the individual color lights are allowed to enter. Consequently, by selecting through the waveguide type optical switch 30 the colors of the color lights admitted into the diffraction type optical elements 40a, 40b and 40c, the incident angles of the individual color lights into the liquid crystal panel 60 can be switched arbitrarily.

Figure 9:
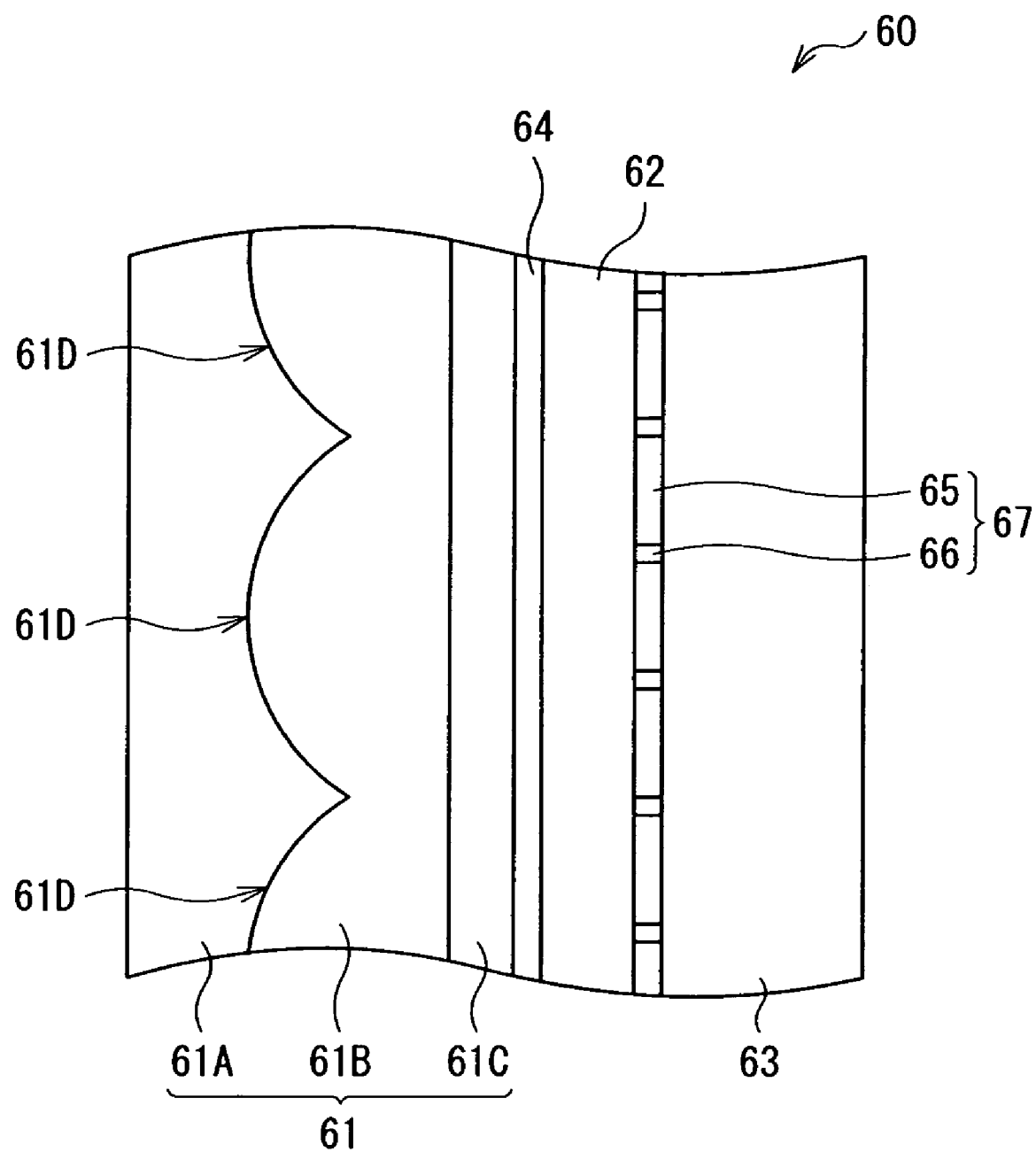
FIG. 9 is a schematic configuration diagram of a liquid crystal panel of FIG. 1.

The liquid crystal panel 60 is a transmission type display apparatus displaying images by active matrix driving, and functions as a light valve to perform optical modulations of the individual color lights entered from the field lens 50 side. The liquid crystal panel 60 has an incident-side substrate 61, a liquid crystal layer 62 and an emission-side substrate 63 in the order from the field lens 50 side, as shown in FIG. 9.

The incident-side substrate 61 has a laminated structure in which a transparent substrate 61A, a microlens array 61B and a transparent substrate 61C are stacked to one another in the order from the field lens 50 side.

Figure 10:
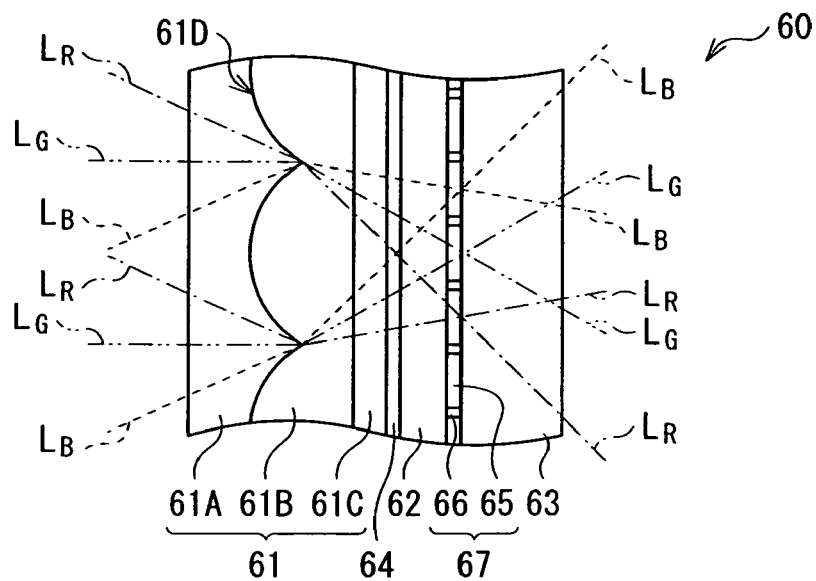
FIG. 10 is a conceptual diagram for explaining the action of the liquid crystal panel of FIG. 9.
Figure 10:
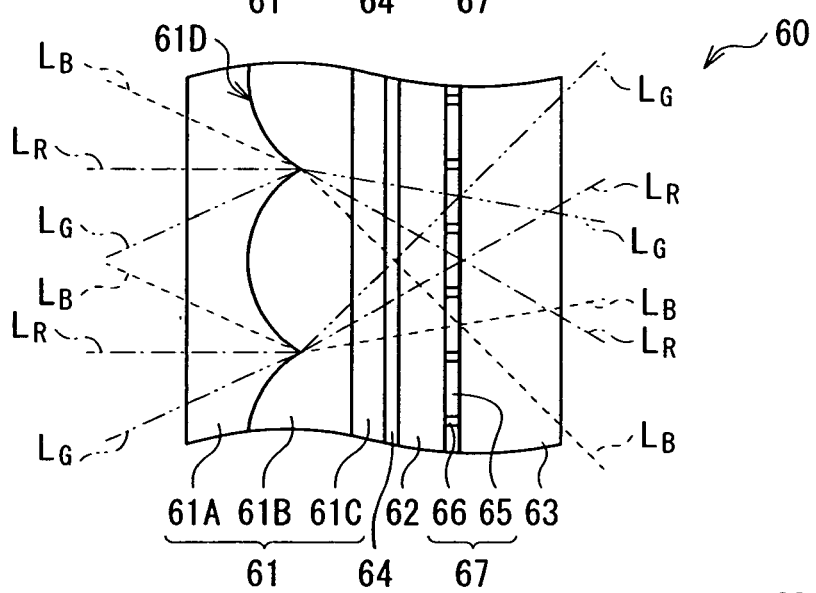
Figure 10:
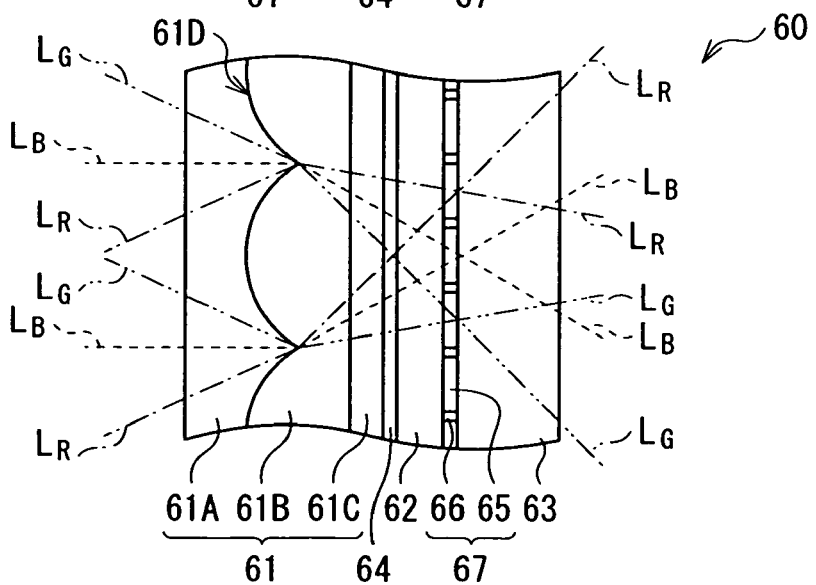

The microlens array 61B is constructed by arranging in a matrix a plurality of microlenses 61D at the incidence regions of the individual color lights made into the parallel lights by the field lens 50. The microlens array 61B is a curved lens formed by curing, for example, a transparent resin or the like, and is configured to refract the individual color lights made into the parallel lights by the field lens 50, and then individually admit them into pixel openings 65 described later, as shown in FIG. 10(A) to (C).

The transparent substrates 61A and 61C are composed of, for example, quartz so as to protect the microlens array 61B from the exterior. Recesses having the reversed shape of the shape of the microlens 61D are formed in a matrix in the surface adjacent to the microlens array 61B of the transparent substrate 61A, and the transparent substrate 61A and the microlens array 61B are contacted to each other, leaving no space therebetween. An opposed common electrode 64 formed of a transparent conductive material such as ITO (Indium Tin Oxide) is formed on the surface adjacent to the liquid crystal layer 62 of the transparent substrate 61C.

The emission-side substrate 63 is a transparent substrate composed of quartz or the like, and the surface adjacent to the liquid crystal layer 62 of the transparent substrate is provided with a pixel section 67. The pixel section 67 has the structure that a plurality of pixel openings 65 are regularly arranged with a black matrix 66 in between, and the pixel openings 65 having the number (three in the present embodiment) equal to the number of colors of the color lights emitted from the three-color light source 10 are arranged oppositely to the individual microlenses 61D.

The pixel openings 65 are composed of ITO or the like, and constitutes one dot together with the opposed common electrode 64 arranged oppositely with the liquid crystal layer 62 in between. As described above, it is configured so that one color light among the individual color lights condensed by the microlens array 61B enters each of the individual pixel openings 65, and pixel signals in accordance with the colors of the color lights transmitting through the pixel openings 65 are applied to the respective pixel openings 65.

Meanwhile, as shown in FIG. 10(A) to (C), by switching through the waveguide type optical switch 30 the incident angles of the individual color lights ($L_R$, $L_G$ and $L_B$) entering the liquid crystal panel 60, in response thereto, the colors of the lights entering the individual dots (the individual pixel openings 65) change sequentially. Accordingly, color image lights can be generated from the individual color lights transmitting through the individual dots by periodically switching through the waveguide type optical switch 30 the incident angles (the optical paths) of the individual color lights entering the liquid crystal panel 60, and by switching through the waveguide type optical switch 30 the pixel signals applied to the individual dots (the individual pixel openings 65) in response to the switching of the incident angles (the optical paths) of the individual color lights. That is, it is configured to enable a 1 pixel full color (multicolor) display with one dot (the pixel opening 65).

The projection lens 70 projects the color image lights modulated by the liquid crystal panel 60 onto the screen (not shown) provided outside of the liquid crystal projector 1.

In the liquid crystal projector 1 of the present embodiment, the polarizing directions of the red light $L_R$, the green light $L_G$ and the blue light $L_B$ emitted individually and independently from the three-color light source 10 are adjusted so as to match with the polarizing axis of the liquid crystal panel 60 by the polarizing plate 20, and thereafter the optical paths of the individual color lights are periodically switched by the waveguide type optical switch 30. This enables periodic switching of the color lights entering the individual diffraction type optical elements 40a, 40b and 40c, so that the incident angles of the individual color lights diffusion-formed by the diffraction type optical elements 40a, 40b and 40c into the field lens 50, and thus the incident angles of the individual color lights into the liquid crystal panel 60 can be switched periodically. As a result, it is capable of periodically admitting the individual color lights into the individual dots of the liquid crystal panel 60, so that the 1 pixel full color (multicolor) display can be performed with one dot, and the number of pixels can be increased approximately three times that of the existing display mode in which the 1 pixel full color display has been performed with three adjacent dots.

By the way, in the present embodiment, the waveguide type optical switch 30 is used to periodically switch the incident angles of the individual color lights into the liquid crystal panel 60. As described above, the waveguide type optical switch 30 is the switch in which the crossing elements 31 functioning as the optical switches for electrically switching the optical paths of the individual color lights are connected through the optical fiber 32, and any noise as in mechanically rotating optical components, such as a galvano-mirror and a step mirror, does not occur at all during switching of the optical paths. Further, there is no need to mechanically move during switching of the optical paths, and therefore the possibility that any malfunction occurs in the waveguide type optical switch 30 is extremely low, and the reliability thereof is extremely high. Furthermore, there is no fear that loss occurs during switching of the optical paths, and it is easy to establish synchronization with other control signals and the like.

Consequently, in the present embodiment, the number of pixels can be increased about three times that of the existing display mode in which the 1 pixel full color display has been performed with three adjacent dots, and no noise occurs during switching of the optical paths of the individual color lights, the reliability is improved, there is no fear that loss occurs, and it is easy to establish synchronization.

Additionally, the present embodiment employs the three-color light source 10 composed of the red laser 10R, the green laser 10G and the blue laser 10B, thus eliminating the necessity for performing a color separation using dichroic mirrors. Thus, the apparatus can be minimized than the case of performing the color separation using the dichloic mirrors.

Additionally, in the present embodiment, as shown in FIGS. 10(A) to (C), the individual color lights ($L_R$, $L_G$, $L_B$) are irradiated all the times to the liquid crystal panel 60, and hence there is no fear of color break that becomes the problem when the individual color lights are irradiated on a per-color basis and time-divisionally to the liquid crystal panel. Further, the light utilization efficiency is higher, and a bright display can be achieved with lower power consumption than the case of irradiating the individual color lights on a per-color basis and time-divisionally to the liquid crystal panel.

Additionally, in the present embodiment, as shown in FIGS. 10(A) to (C), the incident angles of the individual lights ($L_R$, $L_G$, $L_B$) entering the liquid crystal panel 60 are switched to sequentially change the colors of the lights entering the individual pixel openings 65. This means that the individual color lights are sequentially irradiated to the three pixel openings 65 arranged oppositely to the individual microlenses 61D of the liquid crystal panel 60. Consequently, there is no fear that speckle noise peculiar to laser beams occurs on the image projected over the screen.

Second Embodiment

Figure 11:
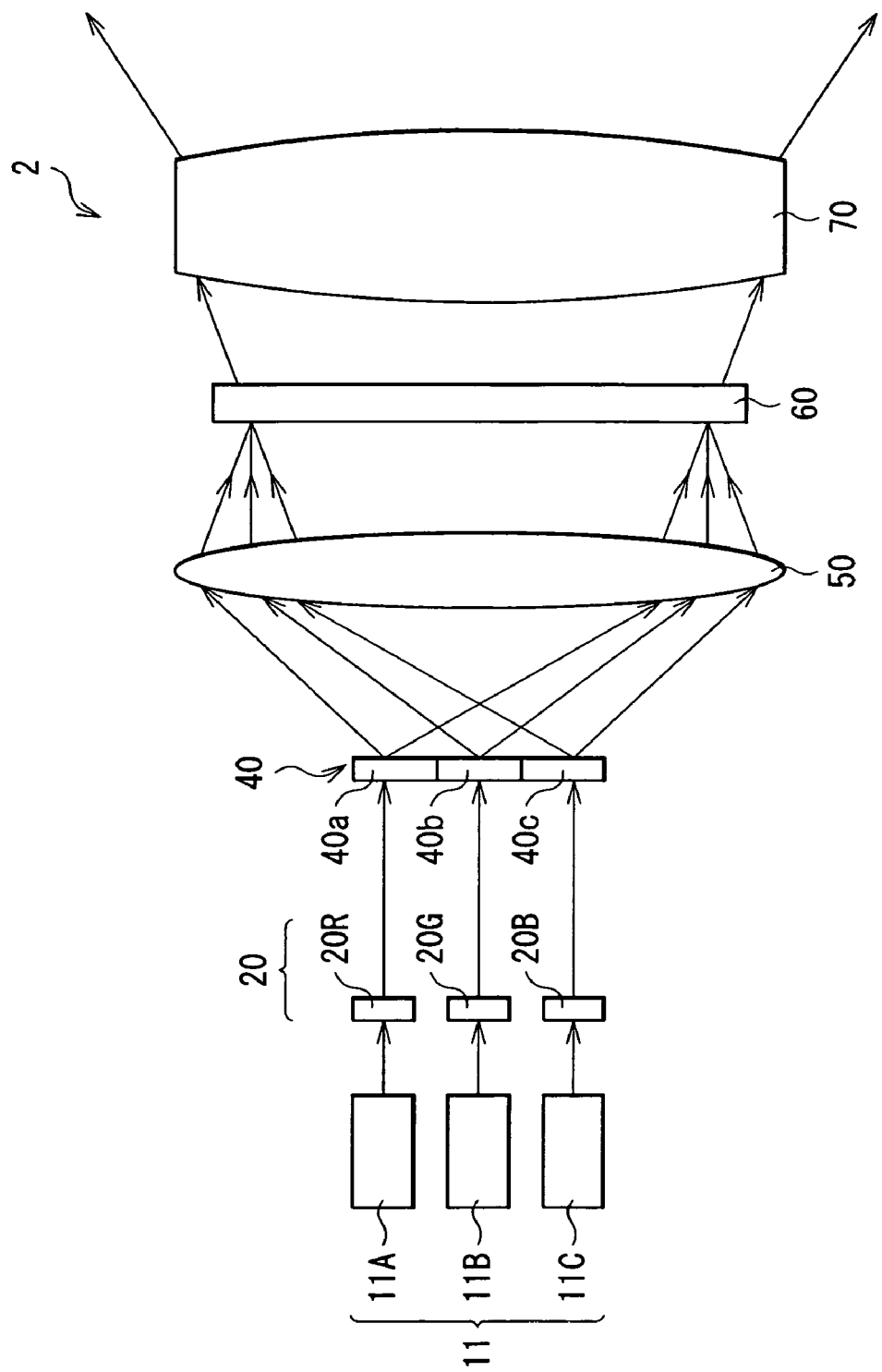
FIG. 11 is a schematic configuration diagram of a liquid crystal projector according to a second embodiment of the invention.

FIG. 11 shows the schematic configuration of a liquid crystal projector 2 (a projection apparatus) according to a second embodiment of the invention. The liquid crystal projector 2 is different from the liquid crystal projector 1 of the foregoing embodiment in the points that it includes a three-color switching light source 11 as the backlight of the liquid crystal panel 60, and does not include the waveguide type optical switch 30. Hereinafter, these differences from the foregoing embodiment will be mainly described, and the descriptions of the configuration, the action and the effect common to the foregoing embodiment are omitted suitably.

The three-color switching light source 11 is configured to include three color lasers 11A, 11B and 11C, and a controller (not shown) to control the light emissions of these three color lasers 11A, 11B and 11C. For example, these three color lasers 11A, 11B and 11C are arranged in parallel so that their respective optical axes are parallel to one another.

Figure 12A:
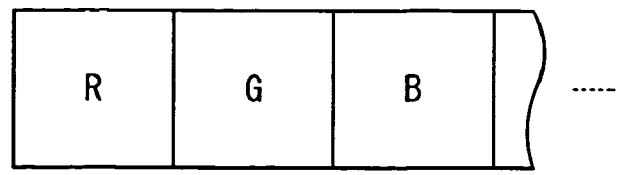
FIG. 12 is a conceptual diagram for explaining a three-color switching light source of FIG. 11.
Figure 12B:
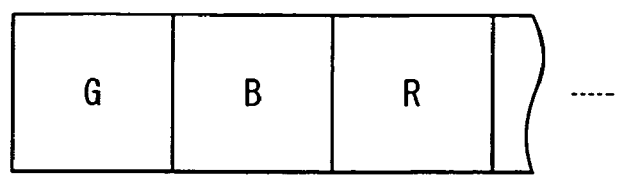
Figure 12C:
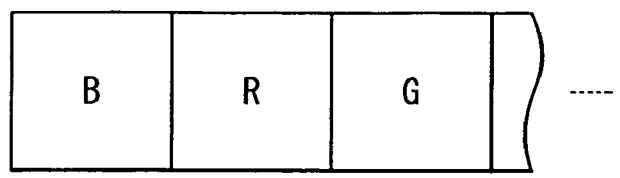

The individual three-color lasers 11A, 11B and 11C have a laser structure capable of emitting red light, green light and blue light from substantially the same position. Under the control of the controller, color lights having different colors are emitted from the individual three-color lasers 11A, 11B and 11C, and the colors of the lights emitted from these three-color lasers 11A, 11B and 11C are periodically switched. For example, as shown in FIG. 12, during a certain period of time τ1, the red light is emitted from the three-color laser 11A, the green light is emitted from the three-color laser 11B, and the blue light is emitted from the three-color laser 11C. Subsequently, during a certain period of time τ2, the green light is emitted from the three-color laser 11A, the blue light is emitted from the three-color laser 11B, and the red light is emitted from the three-color laser 11C. Thereafter, during a certain period of time τ3, the blue light is emitted from the three-color laser 11A, the red light is emitted from the three-color laser 11B, and the green light is emitted from the three-color laser 11C.

Thus, in the present embodiment, it is configured to periodically emit the color lights having different colors from the individual three-color lasers 11A, 11B and 11C, and hence the color lights entering the individual diffraction type optical elements 40a, 40b and 40c can be periodically switched as in the case of switching the optical paths of the individual color lights by using the waveguide type optical switch 30. This enables periodic switching of the incident angles of the individual color lights diffusion-formed by the diffraction type optical elements 40a, 40b and 40c into the field lens 50, and thus the incident angles of the individual color lights into the liquid crystal panel 60. As a result, it is capable of periodically admitting the individual color lights into the individual dots of the liquid crystal panel 60, and therefore 1 pixel full color (multicolor) display can be performed with one dot, and the number of pixels can be increased approximately three times that of the existing display mode in which the 1 pixel full color display has been performed with three adjacent dots. Like the foregoing embodiment, no noise occurs during switching of the optical paths of the individual color lights, the reliability is improved, there is no fear that loss occurs, and it is easy to establish synchronization.

Additionally, the present embodiment uses the three-color light source 10 configured to include the three-color lasers 11A, 11B and 11C, thus eliminating the necessity for performing a color separation using dichroic mirrors. Thus, the apparatus can be minimized than the case of performing the color separation using the dichloic mirrors.

Third Embodiment

Figure 13:
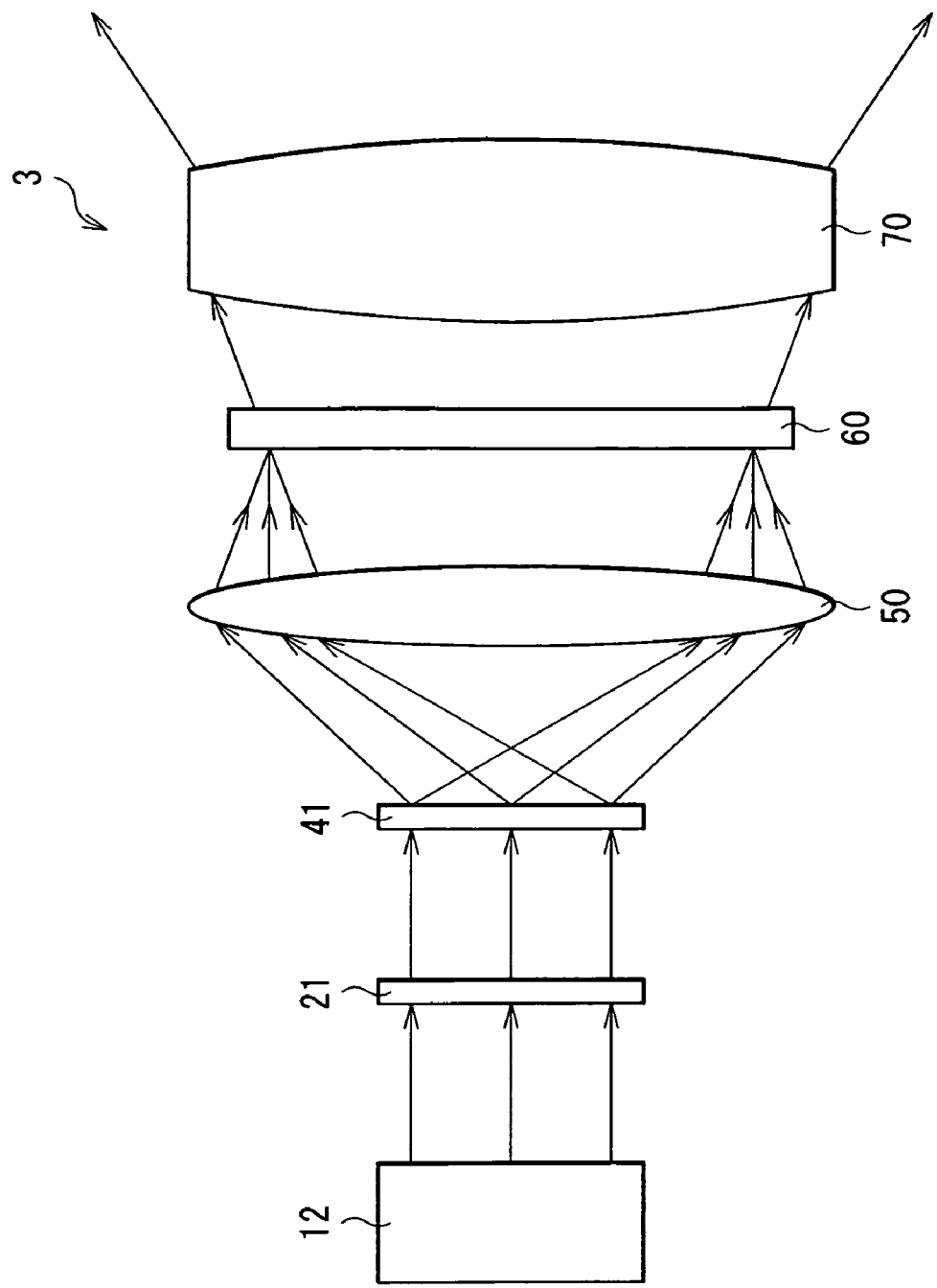
FIG. 13 is a schematic configuration diagram of a liquid crystal projector according to a third embodiment of the invention.

FIG. 13 shows the schematic configuration of a liquid crystal projector 3 (a projection apparatus) according to a third embodiment of the invention. The liquid crystal projector 3 is different from the liquid crystal projector 2 of the second embodiment in the point that it includes a three switching light source array 12, a polarizing plate array 21 and a diffraction type optical element array 41 as the backlight of the liquid crystal panel 60. Hereinafter, the difference from the second embodiment will be mainly described, and the descriptions of the configuration, the action and the effect common to the second embodiment are omitted suitably.

Figure 14:
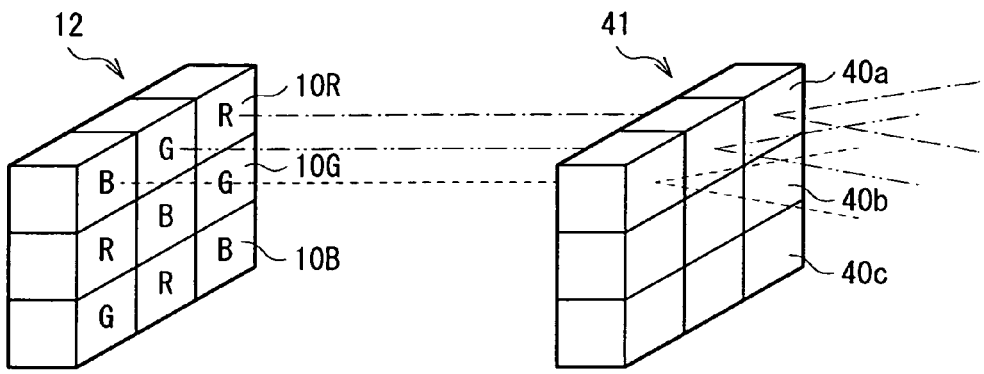
FIG. 14 is a conceptual diagram for explaining the action of a three-color switching light source array of FIG. 13.
Figure 14:
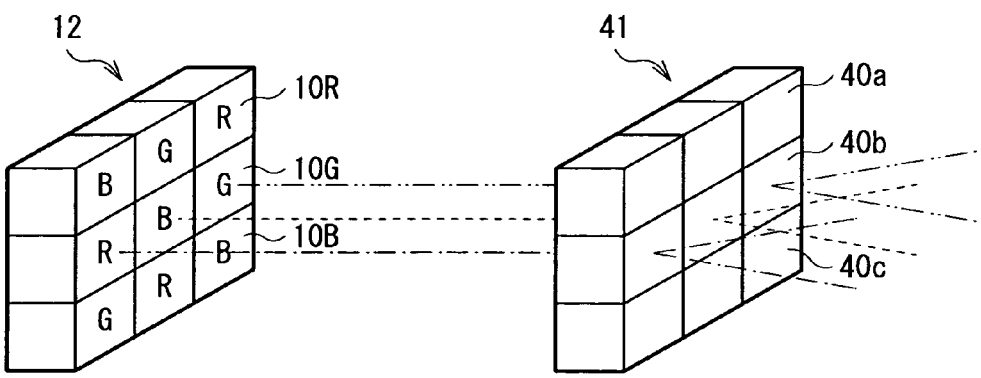
Figure 14:
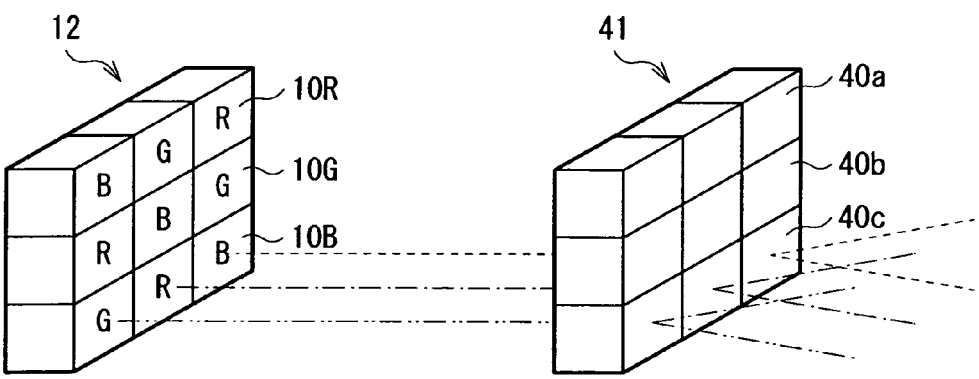

The three-color switching light source array 11 has a plurality of the red lasers 10R, the green lasers 10G and the blue lasers 10B of the first embodiment, respectively, and has a controller (not shown) to control their light emissions. For example, as shown in FIGS. 14(A) to (C), the red lasers 10R, the green lasers 10G and the blue lasers 10B are configured by periodically arranging in a two-dimensional direction so that their respective optical axes are parallel to one another. In FIGS. 14(A) to (C), the polarizing plate array 21 is omitted for convenience.

The polarizing plate array 21 is configured by periodically arranging in a two-dimensional direction the polarizing plates 20R, 20G and 20B of the first embodiment, and the polarizing plates 20R, 20G and 20B are arranged individually on the optical paths of the individual color lights (beam lights) emitted from the red laser 10R, the green laser 10G and the blue laser 10B.

The diffraction type optical element array 41 is configured by periodically arranging in a two-dimensional direction the diffraction type optical elements 40a, 40b and 40c of the first embodiment, and the optical elements 40a, 40b and 40c are arranged individually on the optical paths of the individual color lights (the beam lights) outputted from the polarizing plates 20R, 20G and 20B.

The control of the controller enables driven red laser 10R, green laser 10G and blue laser 10B to be periodically switched through the three-color switching light source array 11. For example, as shown in FIG. 14(A), during a certain period of time, the red laser 10R, the green laser 10G and the blue laser 10BC which are arranged on the upper stage of the three-color switching light source array 11 are driven to emit red light, green light and blue light, respectively. Subsequently, as shown in FIG. 14(B), the red laser 10R, the green laser 10G and the blue laser 10B which are arranged on the middle stage of the three-color switching light source array 11 are driven to emit red light, green light and blue light, respectively, in the array different from the previous period of time. Thereafter, as shown in FIG. 14(C), the red laser 10R, the green laser 10G and the blue laser 10B which are arranged on the lower stage of the three-color switching light source array 11 are driven to emit red light, green light and blue light, respectively, in the array different from the previous period of time.

The individual color lights emitted from the three-color switching light source array 11 transmit through the polarizing plate array 21 and are then diffusion-formed by the diffraction type optical element array 41, and irradiated through the field lens 50 over the liquid crystal panel 60.

Thus, in the present embodiment, it is configured to periodically emit the color lights having different colors from the three-color switching light source array 11, and hence the color lights entering the individual diffraction type optical elements 40a, 40b and 40c can be periodically switched as in the case of switching the optical paths of the individual color lights by using the waveguide type optical switch 30. This enables periodic switching of the incident angles of the individual color lights diffusion-formed by the diffraction type optical elements 40a, 40b and 40c into the field lens 50, and thus the incident angle of the individual color lights into the liquid crystal panel 60. As a result, it is capable of periodically admitting the individual color lights into the individual dots of the liquid crystal panel 60, and therefore 1 pixel full color (multicolor) display can be performed with one dot, and the number of pixels can be increased approximately three times that of the existing display mode in which the 1 pixel full color display has been performed with three adjacent dots. Like the foregoing embodiments, no noise occurs during switching of the optical paths of the individual color lights, the reliability is improved, there is no fear that loss occurs, and it is easy to establish synchronization.

Additionally, the present embodiment uses the three-color switching light source array 11 configured to include the red laser 10R, the green laser 10G and the blue laser 10B, thus eliminating the necessity for performing a color separation using dichroic mirrors. Thus, the apparatus can be minimized than the case of performing the color separation using the dichloic mirrors.

Fourth Embodiment

Figure 15:
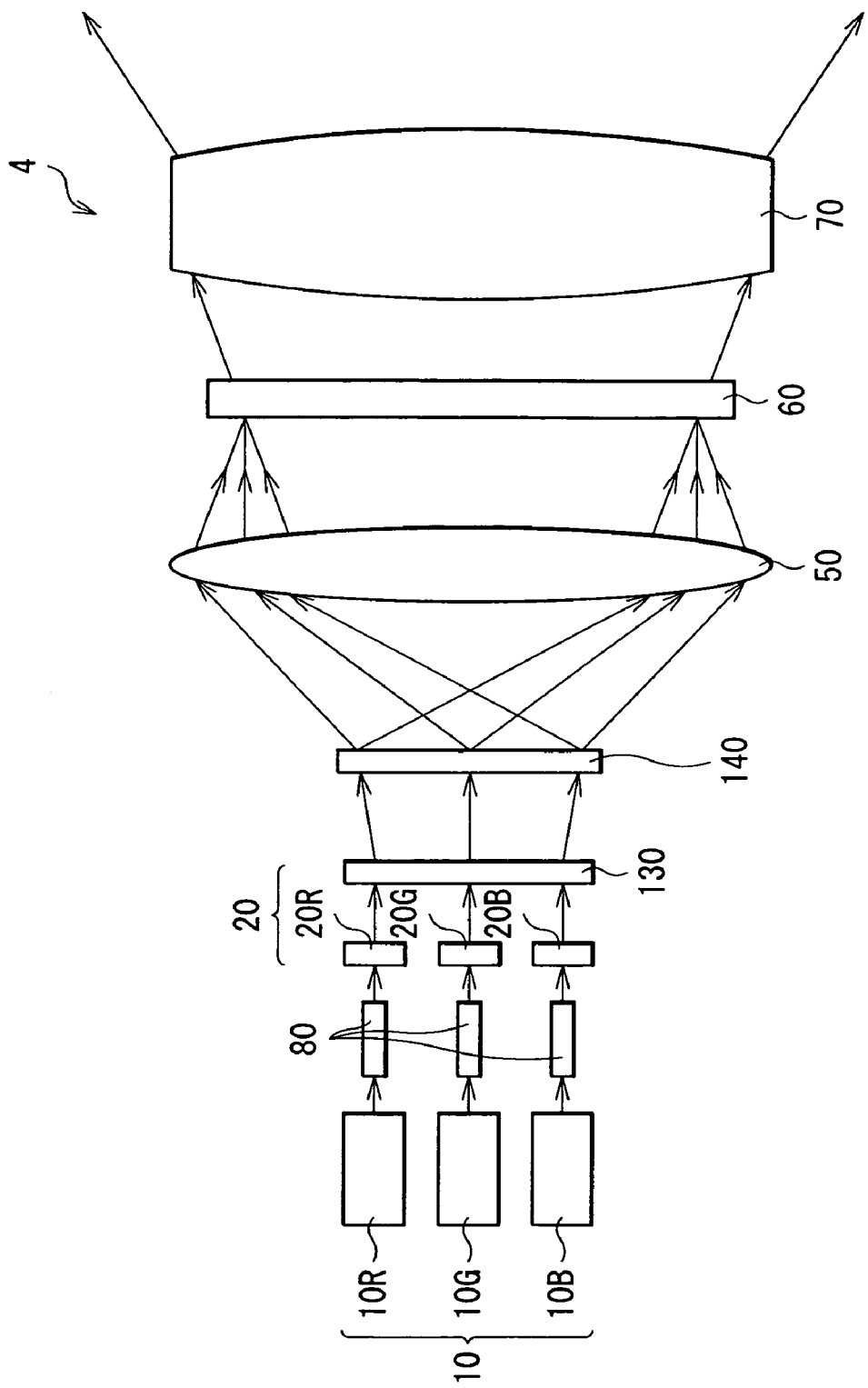
FIG. 15 is a schematic configuration diagram of a liquid crystal projector according to a fourth embodiment of the invention.

FIG. 15 shows the schematic configuration of a liquid crystal projector 4 (a projection apparatus) according to a fourth embodiment of the invention. The liquid crystal projector 4 is different from the liquid crystal projector 1 of the first embodiment in the points that a beam expander 80 is provided between the three-color light source 10 and the polarizing plate 20, and a diffraction type optical element 130 (an optical path switching section) is provided instead of the waveguide type optical switch 30, and a refraction type optical element 140 (a diffusion forming section) is provided instead of the diffraction type optical element 40. Hereinafter, the difference from the first embodiment will be mainly described, and the descriptions of the configuration, the action and the effect common to the first embodiment are omitted suitably.

The beam expander 80 is constructed of, for example, a collimation optical system, and configured to bring the cross-sectional shapes of the individual color lights emitted from the three-color light source 10 close to a circle.

Figure 16:
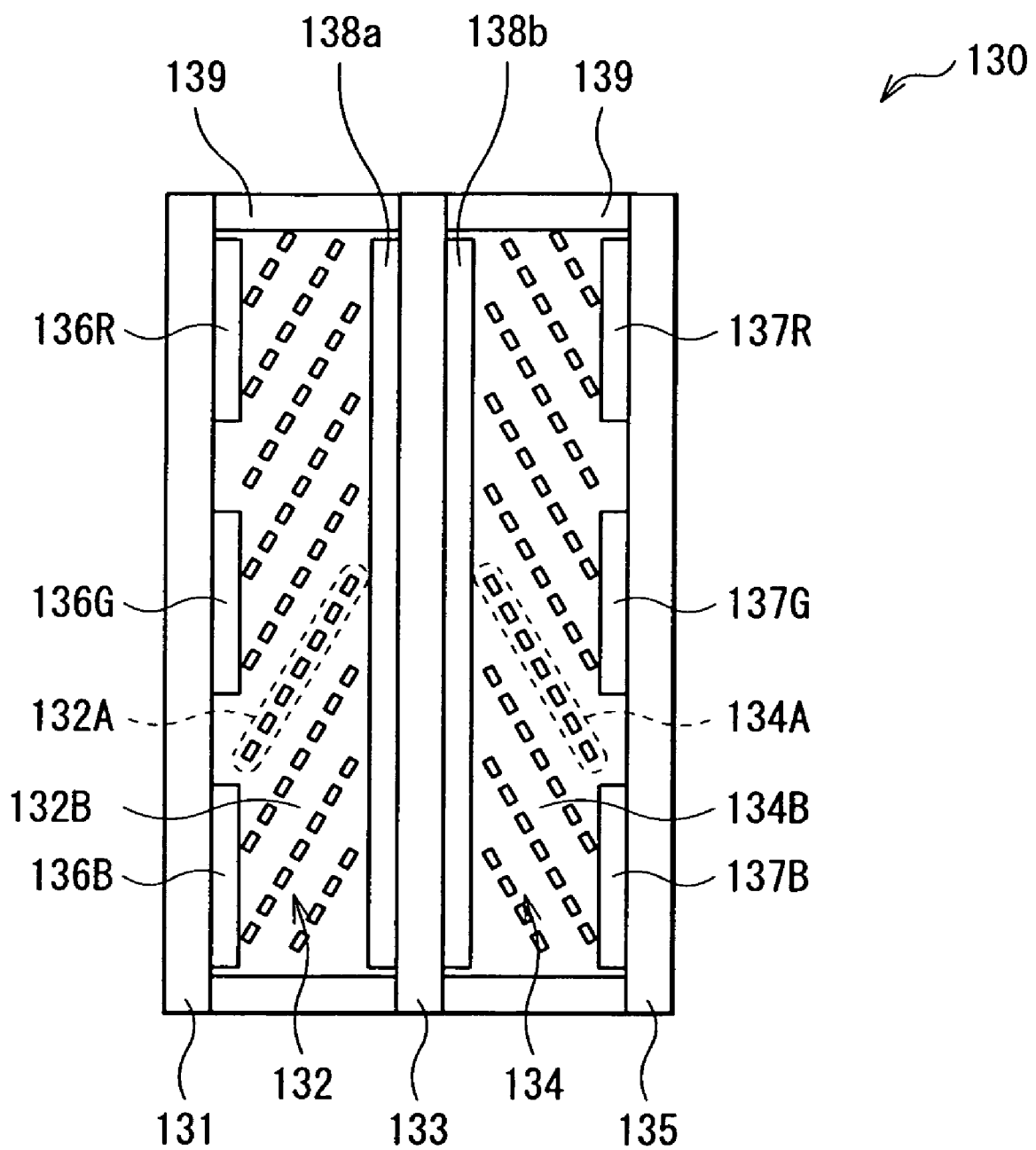
FIG. 16 is a schematic configuration diagram of a diffraction type optical element of FIG. 15.

The diffraction type optical element 130 is, as shown in FIG. 16, configured by arranging a transparent substrate 131, a liquid crystal layer 132, a transparent substrate 133, a liquid crystal layer 134 and a transparent substrate 135 in this order from the polarizing plate 20 side. Individual electrodes 136R, 136G and 136B are formed on the surface of the transparent substrate 131 adjacent to the liquid crystal layer 132, and individual electrodes 137R, 137G and 137B are formed on the surface of the transparent substrate 135 adjacent to the liquid crystal layer 134. A common electrode 138a is formed on the surface of the transparent substrate 133 adjacent to the liquid crystal layer 132, and a common electrode 138b is formed on the surface of the transparent substrate 133 adjacent to the liquid crystal layer 134. A spacer 139 is formed on the side surfaces of the liquid crystal layers 132 and 134, respectively.

The transparent substrates 131, 133 and 135 and the spacer 139 are composed of, for example, quartz or the like. The liquid crystal layers 132 and 134 are composed of polymer dispersed liquid crystal (PDLC). The polymer dispersed liquid crystal has liquid crystal dispersed regions 132A and 134A where liquid crystal is dispersed in a high concentration, and polymer regions 132B and 143B where polymer is dispersed in a high concentration. In the liquid crystal layers 132 and 134, with no voltage applied, liquid crystal dispersed regions 132A and 134A have different orientations. Thus, the liquid crystal layer 132 and the liquid crystal layer 134 have different directions of refraction upon application of a voltage.

Figure 17:
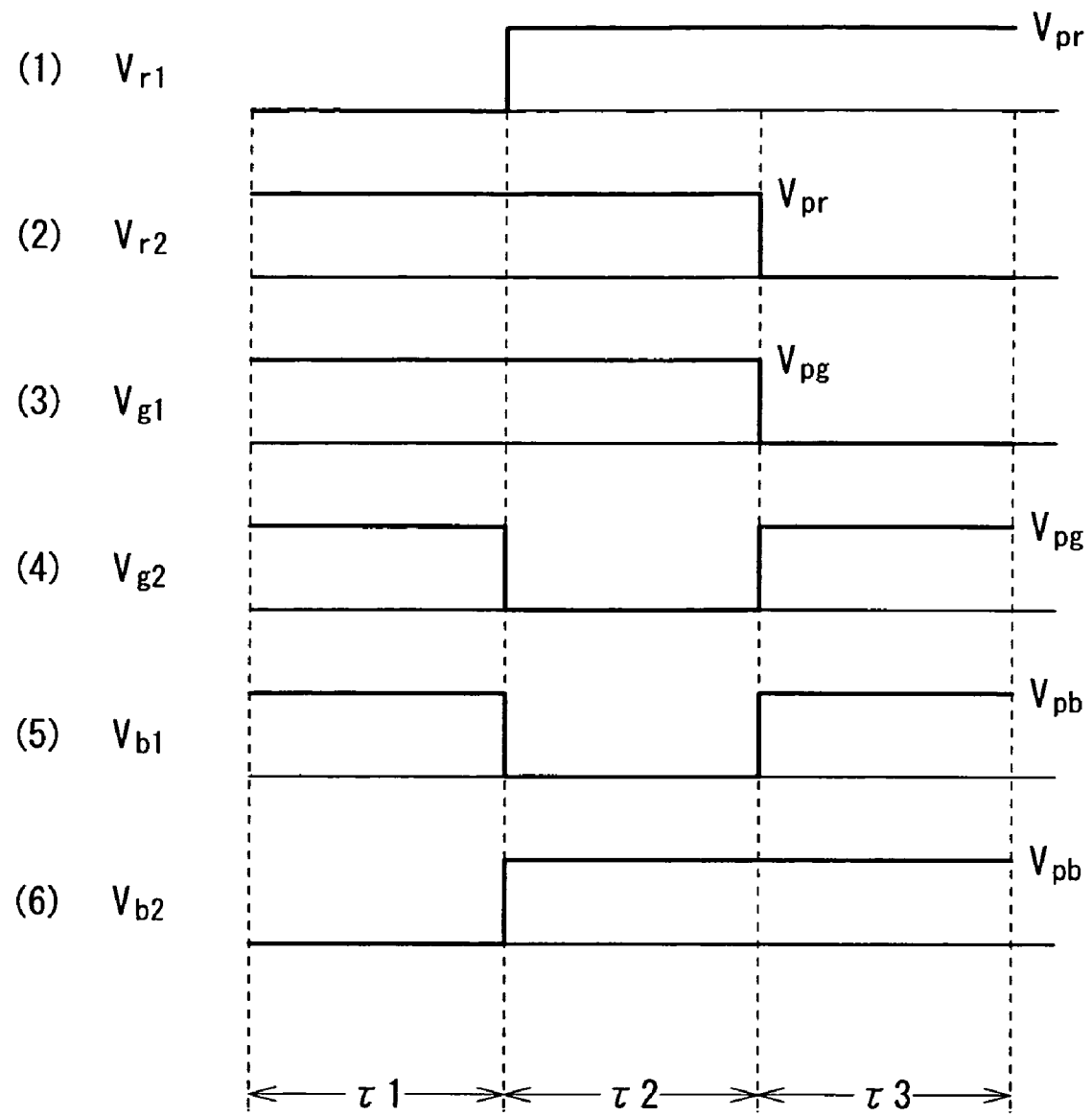
FIG. 17 is a waveform diagram for explaining the action of the diffraction type optical element of FIG. 16.

Let the voltage between the individual electrode 136R and the common electrode 138a be Vr1, the voltage between the individual electrode 137R and the common electrode 138b be Vr2, the voltage between the individual electrode 136G and the common electrode 138a be Vg1, the voltage between the individual electrode 137G and the common electrode 138b be Vg2, the voltage between the individual electrode 136B and the common electrode 138a be Vb1, and the voltage between the individual electrode 137B and the common electrode 138b be Vb2. For example, upon application of a voltage to each of Vr1, Vr2, Vg2, Vb1 and Vb2, as shown in FIG. 17, the individual color lights entered into the diffraction type optical element 130 are, for example, as shown in FIG. 18(A) in a period of time τ1, and are as shown in FIG. 18(B) in a period of time τ2, and are as shown in FIG. 18(C) in a period of time τ3.

Here, in the period of time τ1, Vr1 is zero volt, Vr2 is Vpr (>0) volt, Vg1 and Vg2 are Vpg (>0) volt, Vb1 is Vpb (>0) volt, and Vb2 is zero volt. In the period of time τ2, Vr1 and Vr2 are Vpr volt, Vg1 is Vpg volt, Vg2 is zero volt, Vb1 is zero volt, and Vb2 is Vpb volt. In the period of time τ3, Vr1 is Vpr volt, Vr2 is zero volt, Vg1 is zero volt, Vg2 is Vpg volt, and Vb1 and Vb2 are Vpb volt.

Figure 18A:
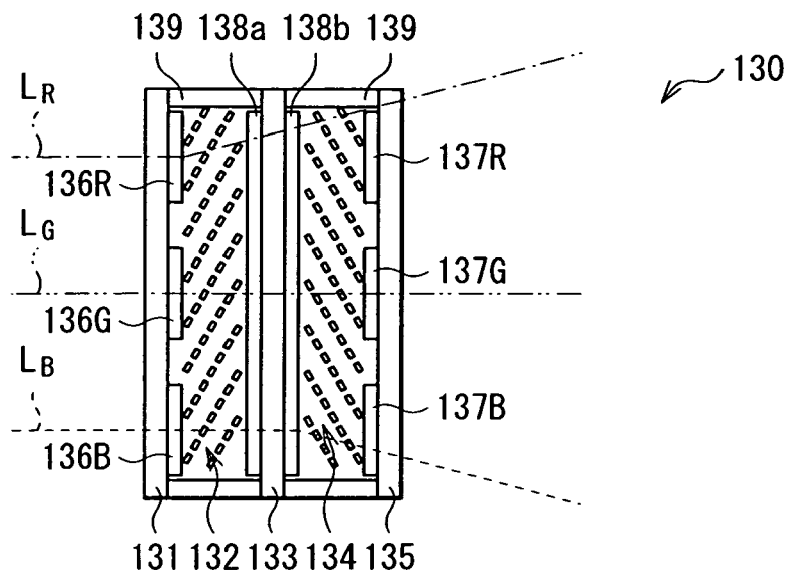
FIG. 18 is a waveform diagram for explaining the action of the diffraction type optical element of FIG. 16.
Figure 18B:
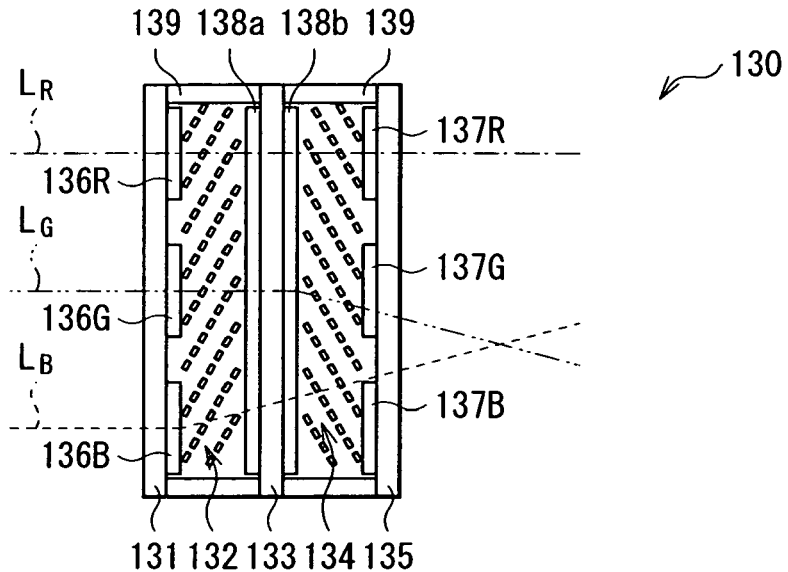
Figure 18C:
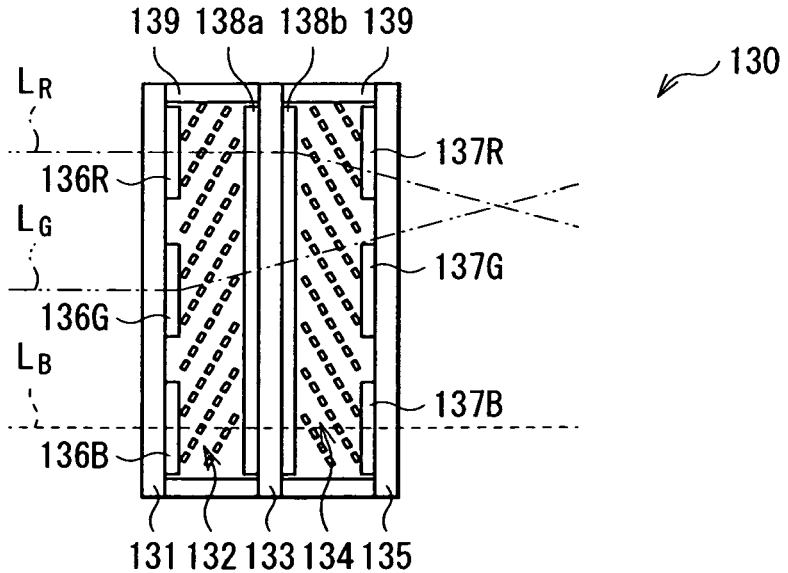

As exemplified in FIGS. 18(A) to (C), in the regions of the liquid crystal layers 132 and 134 to which the voltage is applied, the individual color lights do not diffract and transmit linearly. On the other hand, in the region of the liquid crystal layer 132 to which no voltage is applied, the individual color lights are diffracted and transmitted, for example, upward on the paper surfaces of FIGS. 18(A) to (C). In the region of the liquid crystal layer 134 to which no voltage is applied, the individual color lights are diffracted and transmitted, for example, downward on the paper surfaces of FIGS. 18(A) to (C). That is, the emission directions (the optical paths) of the individual color lights can be switched periodically by applying the voltages to Vr1, Vr2, Vg1, Vg2, Vb1 and Vb2, respectively, as shown in FIG. 17.

The refraction type optical element 140 is configured by commonly providing on the optical paths of the individual color lights (the beam lights) outputted from the diffraction type optical element 130. The refraction type optical element 140 is configured to perform diffusion forming of the individual color lights outputted from the diffraction type optical element 130 so as to expand throughout the entire display region (not shown) of the liquid crystal panel 60. Specifically, the refraction type optical element 140 converts the individual color lights (the beam lights) entered at different angles to the surface adjacent to the diffraction type optical element 130, into diffused lights, and admit these diffused lights into the field lens 50 at different incident angles.

The refraction type optical element 140 is formed by arranging in two-dimension, for example, microlenses having various shapes and curvatures, and configured to form the cross-sectional shapes of emitted lights into predetermined shapes and dimensions by refracting incident lights with the individual microlenses and overlapping the refracted lights one another, and also irradiate an output plane so as to make the luminance distribution uniform. Meanwhile, such elements can be referred to on internet (for example, URL; http://www.rpcphotonics.com/engineer_diffuser.htm) and the like.

In the present embodiment, the red light $L_r$, the green light $L_G$ and the blue light $L_B$ individually and independently emitted from the three-color light source 10 are adjusted by the polarizing plate 20 so that their polarizing directions are matched with the polarizing axis of the liquid crystal panel 60, and thereafter the emission directions (the optical paths) of the individual color lights are periodically switched by the diffraction type optical element 130. This enables periodic switching of the incident angles of the individual color lights entering the refraction type optical element 140, so that the incident angles of the individual color lights diffusion-formed by the refraction type optical element 140 into the field lens 50, and thus the incident angles of the individual color lights into the liquid crystal panel 60 can be switched periodically. As a result, it is capable of periodically admitting the individual color lights into the individual dots of the liquid crystal panel 60, and therefore 1 pixel full color (multicolor) display can be performed with one dot, and the number of pixels can be increased approximately three times that of the existing display mode in which the 1 pixel full color display has been performed with three adjacent dots.

By the way, in the present embodiment, the diffraction type optical element 130 is used to periodically switch the incident angles of the individual color lights into the liquid crystal panel 60. As described above, the diffraction type optical element 130 functions as the optical switch for electrically switching the emission directions (the optical paths) of the individual color lights, and hence any noise as in mechanically rotating optical components, such as a galvano-mirror and a step mirror, does not occur at all during switching of the emission direction (the optical path). Further, there is no need to mechanically move during switching of the emission directions (optical paths), and therefore the possibility that any malfunction occurs in the diffraction type optical element 130 is extremely low, and the reliability thereof is extremely high. Furthermore, it is easy to establish synchronization with other control signals and the like when the emission directions (the optical paths) are switched.

Consequently, in the present embodiment, the number of pixels can be increased about three times that of the existing display mode that the 1 pixel full color display has been performed with three adjacent dots, and no noise occurs during switching of the emission directions (the optical paths) of the individual color lights, the reliability is improved, there is no fear that loss occurs, and it is easy to establish synchronization.

Application Examples

Figure 19:
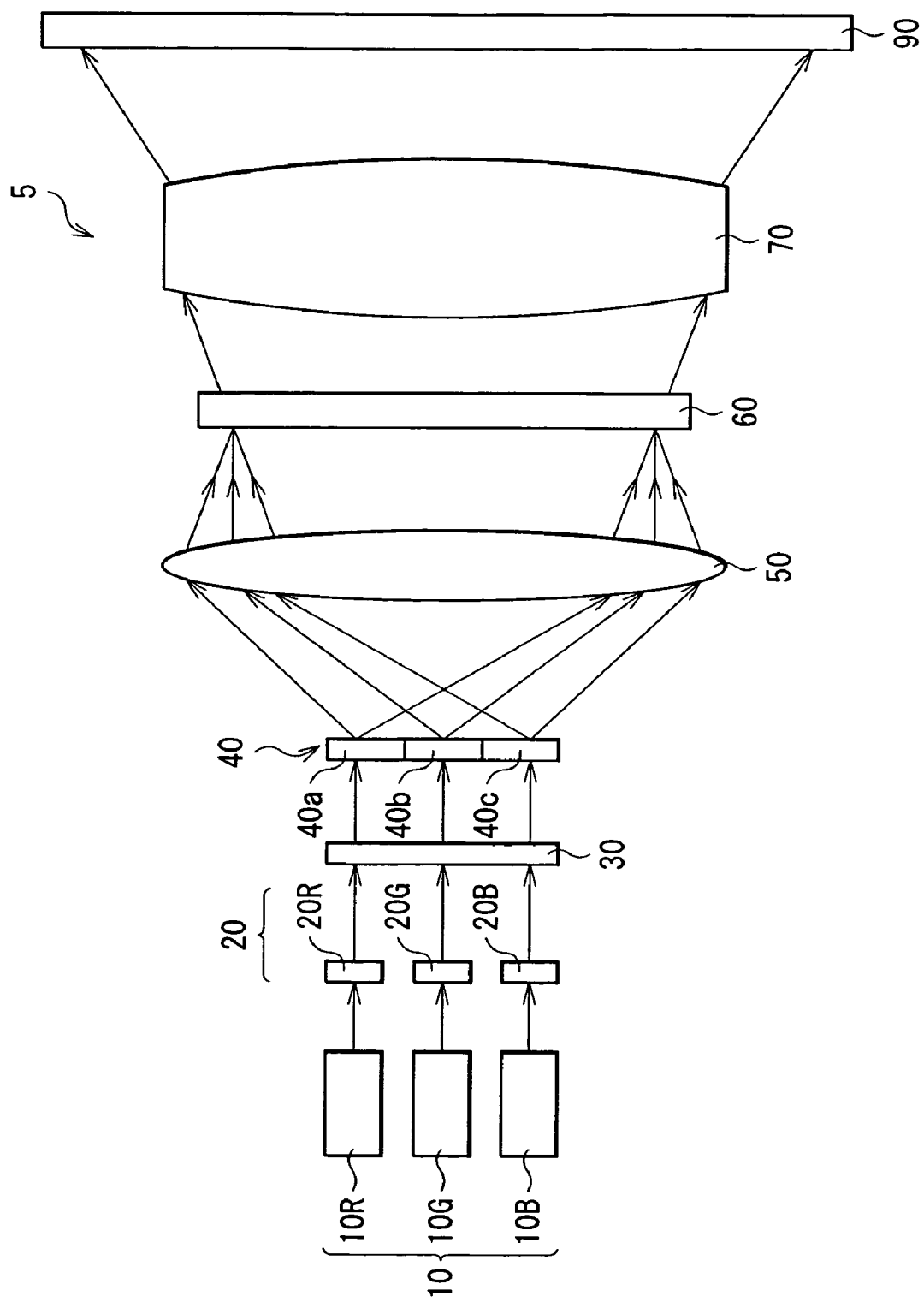
FIG. 19 is a schematic configuration diagram of an image display apparatus according to a fifth embodiment of the invention.
Figure 20:
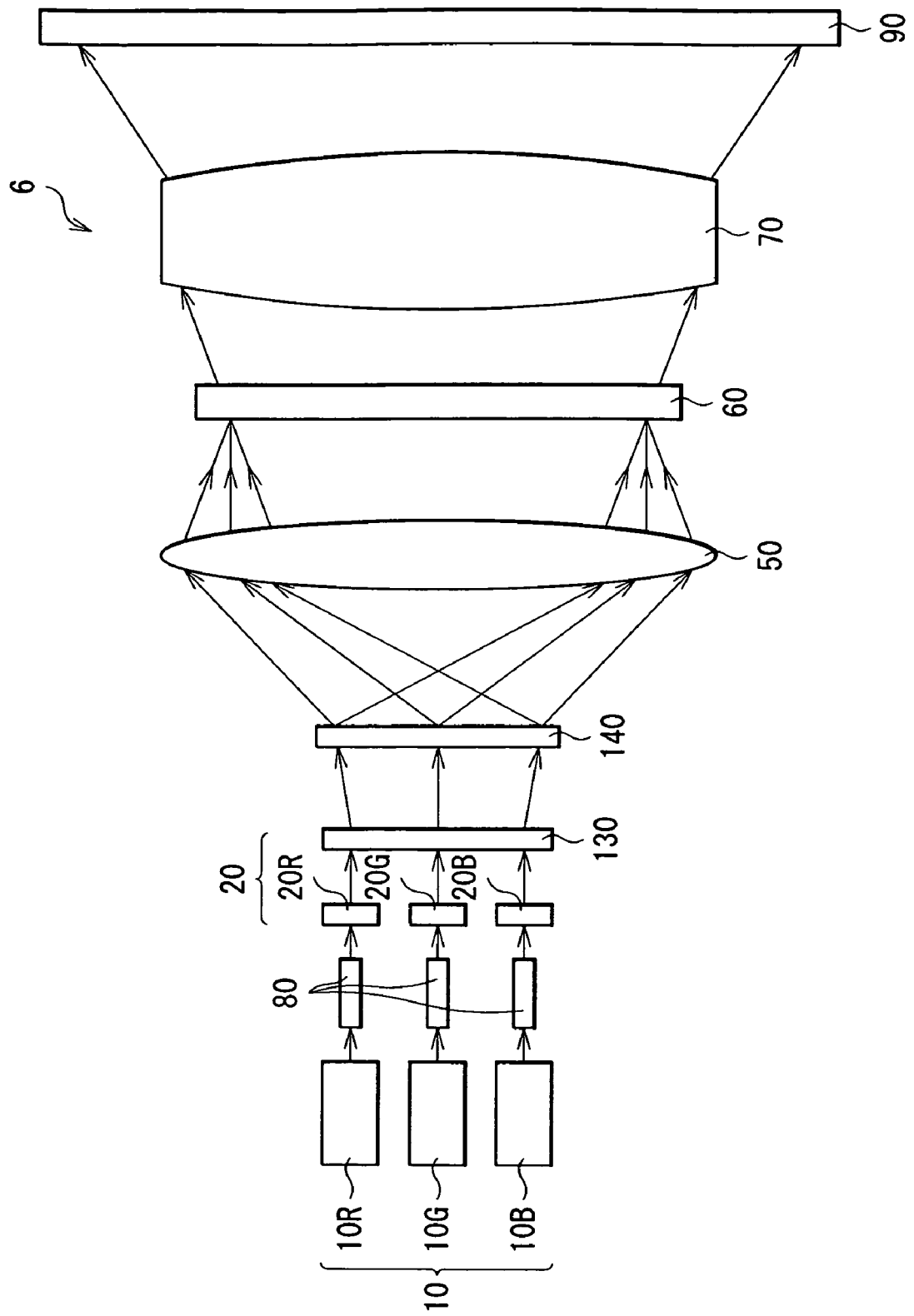
FIG. 20 is a schematic configuration diagram of an image display apparatus according to a sixth embodiment of the invention.

The liquid crystal projectors 1 to 4 of the first to fourth embodiments are applicable to a back projection type image display apparatus with a screen 90 housed therein. For example, the screen 90 is arranged on the projection side of the liquid crystal projector 1 in an image display apparatus 5, as shown in FIG. 19. Similarly, for example, the screen 90 is arranged on the projection side of the liquid crystal projector 4 in an image display apparatus 6, as shown in FIG. 20. Accordingly, it is configured to project the color image lights outputted from the liquid crystal projector 1 onto the back of the screen 90, and display the images on the surface of the screen 90.

Thus, the image display apparatuses in the present application examples house therein the liquid crystal projectors 1 to 4 of the first to fourth embodiments, thereby producing the same action and effects as the first to fourth embodiments.

While the present invention has been described with reference to the plurality of embodiments and the application examples, the present invention is not limited to these embodiments and the like, and various modifications are possible.

For example, in the embodiments and the like, the configurations of the liquid crystal projectors 1 to 4 have been described specifically, it is unnecessary to have all of the configurations. Alternatively, other configuration may be provided therein. That is, various selections can be made depending on the use and the purpose.

Although the case of using the active matrix type liquid crystal panel 60 has been described in the embodiments and the like, the present invention is also applicable to simple matrix driving liquid crystal panels.

Although the case of using the liquid crystal panel 60 as the light valve has been described in the embodiments and the like, it is of course possible to use a display panel utilizing other principle as a light valve.

Although the case of using the laser as the backlight of the liquid crystal panel 60 has been described in the embodiments, it is of course possible to use monochrome light emitting elements such as LEDs (light emitting diodes) as a backlight.

Figure 21:
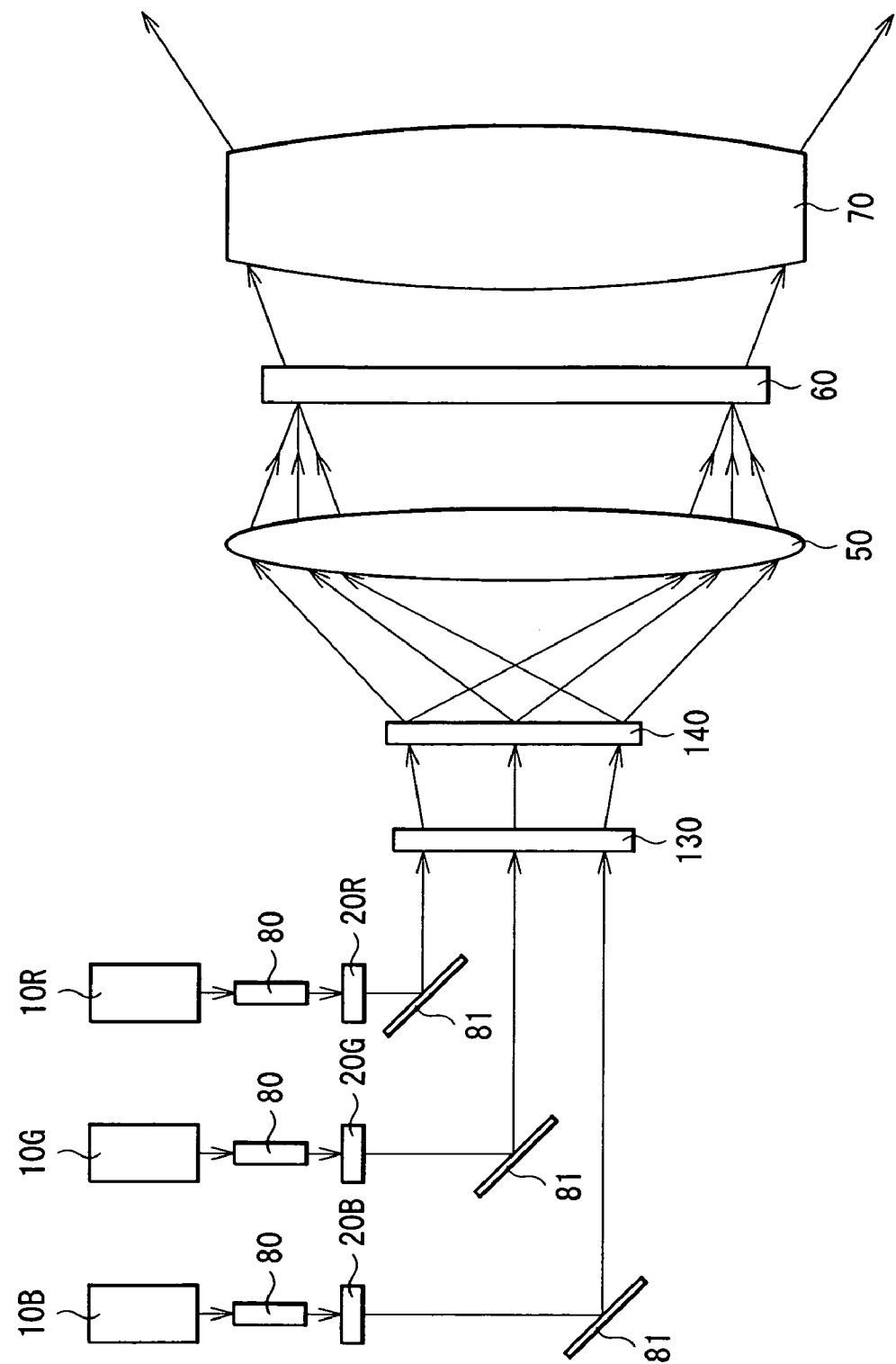
FIG. 21 is a schematic configuration diagram of a liquid crystal projector according to a modification example.
Figure 22:
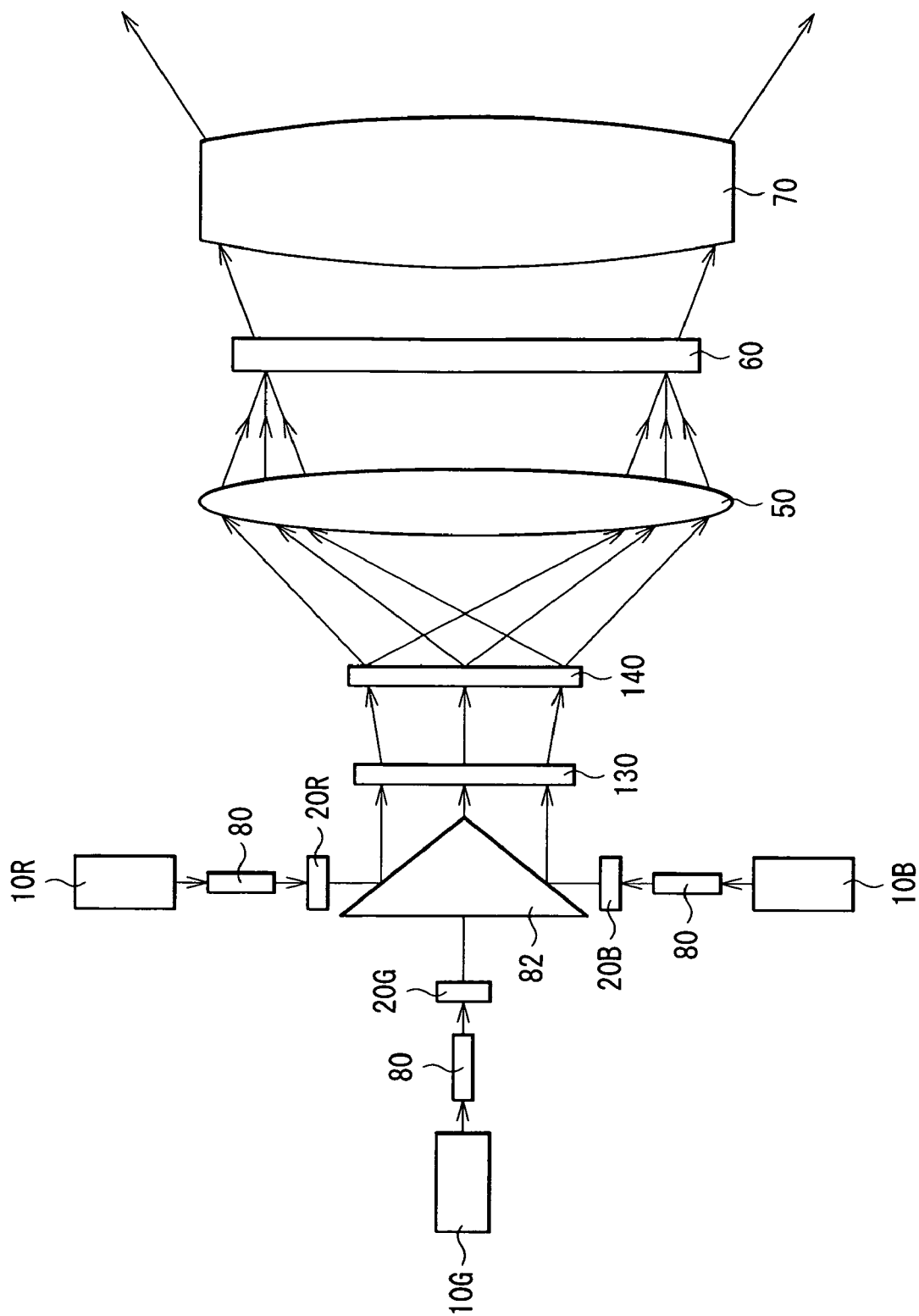
FIG. 22 is a schematic configuration diagram of a liquid crystal projector according to another modification example.

Although in the embodiments, any optical elements such as a dichloic mirror 81 (refer to FIG. 21) and a prism 82 (refer to FIG. 22) are not arranged on the optical paths of the individual color lights, they may be arranged on the optical paths. This enables the layouts of the three-color light source 10 and the three-color switching light source array 11 to have certain degrees of freedom.

Although in the fourth embodiment, the diffraction type optical element 130 is configured to include the liquid crystal layer 132 and the liquid crystal layer 134 composed of polymer dispersed liquid crystal, it may be configured by other diffraction type optical element, for example, and an acoustic optical element (an AO element).

The invention claimed is:

1. A projection apparatus characterized by comprising:
   a light source section individually and independently emitting a plurality of color lights having different wavelengths;
   an optical path switching section electrically switching optical paths of individual color lights emitted from the light source section, at predetermined time intervals;
   a diffusion forming section converting individual color lights outputted from the optical path switching section into diffused lights having different optical axis directions;
   a parallel light making section making individual color lights diffusion-formed by the diffusion forming section into parallel lights on a per color light basis;
   a color image light generating section having a microlens array where a plurality of microlenses are arranged in a matrix at incident regions of individual color lights made into parallel lights by the parallel light making section, and having a pixel section where dots whose number is equal to the number of colors of color lights emitted from the light source section are arranged oppositely to the individual microlenses, and generating color image lights by using individual color lights transmitted through the individual dots; and
   a projection section enlarging and projecting color image lights generated by the color image light generating section.

2. The projection apparatus according to claim 1, characterized in that the light source section is at least one of a semiconductor laser and a solid-state laser.

3. The projection apparatus according to claim 1, characterized in that the optical path switching section is a waveguide type optical switch.

4. The projection apparatus according to claim 1, characterized in that the optical path switching section is a diffraction type optical element configured by arranging a pair of conductive transparent substrates on both sides of a liquid crystal layer.

5. The projection apparatus according to claim 1, characterized in that the optical path switching section is an acoustic optical element.

6. The projection apparatus according to claim 1, characterized in that the optical path switching section switches the optical paths of individual color lights emitted from the light source section, on a per-field, per-frame or per-multiframe basis.

7. The projection apparatus according to claim 1, characterized in that the optical path switching section switches the optical paths of individual color lights emitted from the light source section, at a frequency that is an integral multiple of the frequency of one field or one frame.

8. The projection apparatus according to claim 1, characterized in that the diffusion forming section is a diffraction type optical element to diffuse individual color lights so as to make a luminance distribution uniform.

9. The projection apparatus according to claim 1, characterized in that the diffusion forming section is a refraction type optical element configured by arranging a plurality of microlenses in a matrix.

10. The projection apparatus according to claim 1, characterized in that
the color image light generating section is a liquid crystal panel having an incident-side substrate, a liquid crystal layer and an emission-side substrate in this order from the parallel light making section side, and
the microlens array is formed on the incident-side substrate, and the pixel section is formed on the emission-side substrate.

11. The projection apparatus according to claim 1, characterized in that the color image light generating section switches pixel signals applied to the individual dots in response to switching of the optical paths of individual color lights by the optical path switching section.

12. A projection apparatus characterized by comprising:
a light source section individually and independently emitting a plurality of color lights having different wavelengths, and electrically switching the wavelengths of the individually and independently emitted individual color lights, at predetermined time intervals;
a diffusion forming section converting individual color lights emitted from the light source section into diffused lights having different optical axis directions;
a parallel light making section making individual color lights diffusion-formed by the diffusion forming section into parallel lights on a per color light basis;
a color image light generating section having a microlens array where a plurality of microlenses are arranged in a matrix at incident regions of individual color lights made into parallel lights by the parallel light making section, and having a pixel section where dots whose number is equal to the number of colors of color lights emitted from the light source section are arranged oppositely to the individual microlenses, and generating color image lights by using individual color lights transmitted through the individual dots; and
a projection section enlarging and projecting color image lights generated by the color image light generating section.

13. An image display apparatus characterized by comprising:
a light source section individually and independently emitting a plurality of color lights having different wavelengths;
an optical path switching section electrically switching the optical paths of individual color lights emitted from the light source section, at predetermined time intervals;
a diffusion forming section converting individual color lights outputted from the optical path switching section into diffused lights having different optical axis directions;
a parallel light making section making individual color lights diffusion-formed by the diffusion forming section into parallel lights on a per color light basis;
a color image light generating section having a microlens array where a plurality of microlenses are arranged in a matrix at incident regions of individual color lights made into parallel lights by the parallel light making section, and having a pixel section where dots whose number is equal to the number of colors of color lights emitted from the light source section are arranged oppositely to the individual microlenses, and generating color image lights by using individual color lights transmitted through the individual dots; and
a projection section enlarging and projecting color image lights generated by the color image light generating section onto the back of a screen.

14. An image display apparatus characterized by comprising:
a light source section individually and independently emitting a plurality of color lights having different wavelengths, and electrically switching the wavelengths of the individually and independently emitted individual color lights, at predetermined time intervals;
a diffusion forming section converting individual color lights emitted from the light source section into diffused lights having different optical axis directions;
a parallel light making section making individual color lights diffusion-formed by the diffusion forming section into parallel lights on a per color light basis;
a color image light generating section having a microlens array where a plurality of microlenses are arranged in a matrix at incident regions of individual color lights made into parallel lights by the parallel light making section, and having a pixel section where dots whose number is equal to the number of colors of color lights emitted from the light source section are arranged oppositely to the individual microlenses, and generating color image lights by using individual color lights transmitted through the individual dots; and
a projection section enlarging and projecting color image lights generated by the color image light generating section onto the back of a screen.

* * * * *